United States Patent
Nagai et al.

(10) Patent No.: US 7,648,795 B2
(45) Date of Patent: Jan. 19, 2010

(54) ELECTRONIC APPARATUS

(75) Inventors: Masanori Nagai, Aichi (JP); Shigekazu Inaba, Aichi (JP); Tomohiro Tsumura, Aichi (JP); Seiya Amatatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 588 days.

(21) Appl. No.: 11/565,263

(22) Filed: Nov. 30, 2006

(65) Prior Publication Data

US 2007/0148535 A1 Jun. 28, 2007

(30) Foreign Application Priority Data

Dec. 26, 2005 (JP) .............................. 2005-373037

(51) Int. Cl.
*H01M 2/10* (2006.01)
(52) U.S. Cl. .................... 429/97; 386/107; 362/189; 455/575.1; 320/107
(58) Field of Classification Search ............... 362/189, 362/187, 88, 136; 200/50.09, 60; 429/96, 429/97, 179, 123, 156; 455/575.1, 575.4, 455/558; 320/107, 112, 114; 361/679.02, 361/679.27, 679.58, 679.17; 439/500; 386/107
See application file for complete search history.

(56) References Cited

U.S. PATENT DOCUMENTS 5,630,193 A    5/1997  Miyake et al.
6,972,925 B2*  12/2005 Tsuchida .................. 360/85
7,306,878 B2*  12/2007 Takeshita et al. ........... 429/97
2001/0005122 A1  6/2001 Higuchi
2004/0058231 A1  3/2004 Takeshita et al.
2006/0068280 A1  3/2006 Takeshita et al.
2006/0141343 A1  6/2006 Tsutsumi
2007/0147788 A1* 6/2007 Hosoya et al. ............ 386/107

FOREIGN PATENT DOCUMENTS

JP    2005-190731    7/2005
JP    2005-190929    7/2005

* cited by examiner

*Primary Examiner*—Hung V Duong
(74) *Attorney, Agent, or Firm*—Oblon, Spivak, McClelland, Maier & Neustadt, L.L.P.

(57) ABSTRACT

An electronic apparatus includes: a case body having a battery storing portion formed of a concave portion whose shape is approximately corresponding to an external shape of a battery unit and a sliding member slidably supported on a surface of the case body on the opposite side to the battery storing portion. The battery storing portion has a width corresponding to that of the battery unit, a length corresponding to a length of the battery unit, and a body-side connection terminal connected to a connection terminal of the battery unit. The sliding member includes one or more engagement claws penetrating through the case body, projecting to the inside of the battery storing portion, capable of being engaged with engagement convex portions provided in the battery unit, and a biasing member causing the claws to be biased away from the body-side connection terminal and engaged with the engagement convex portions.

6 Claims, 17 Drawing Sheets

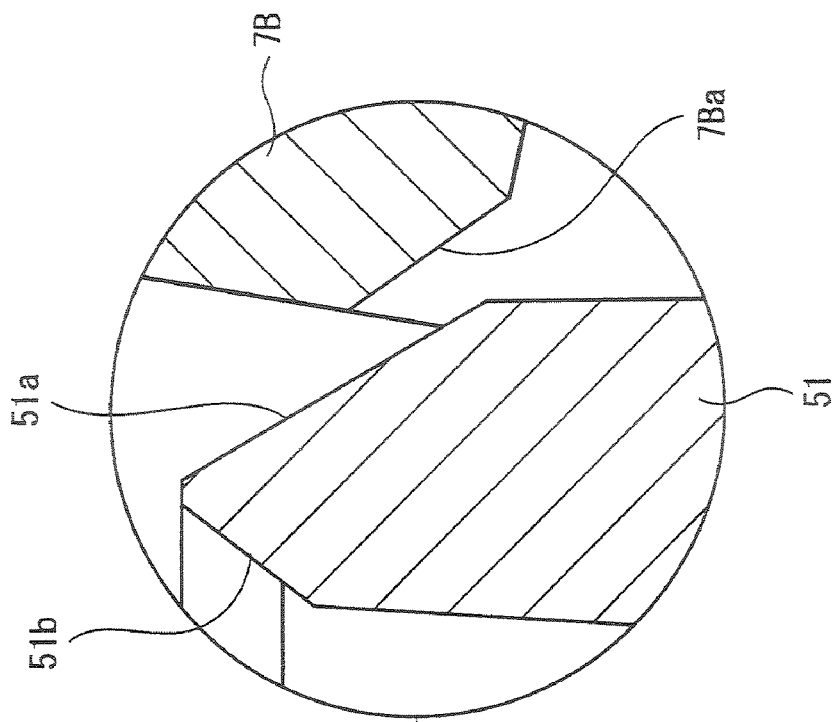
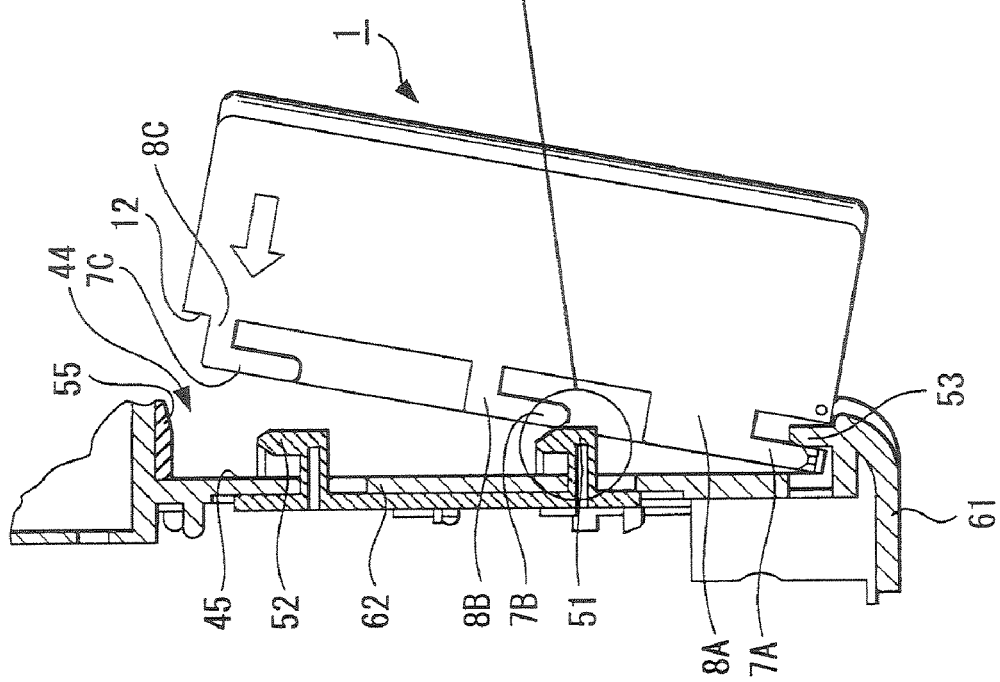

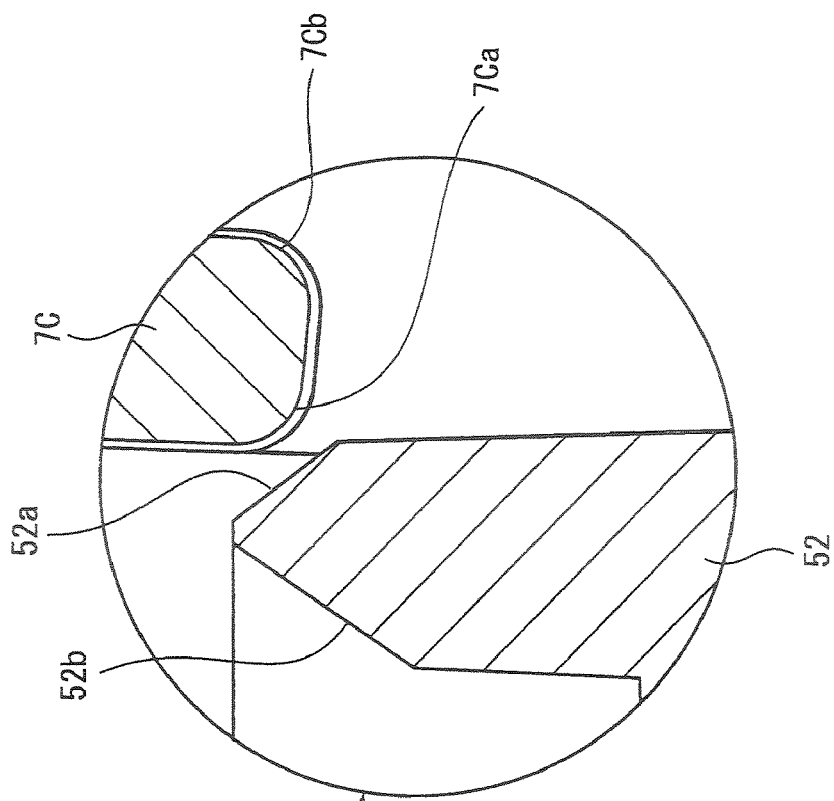
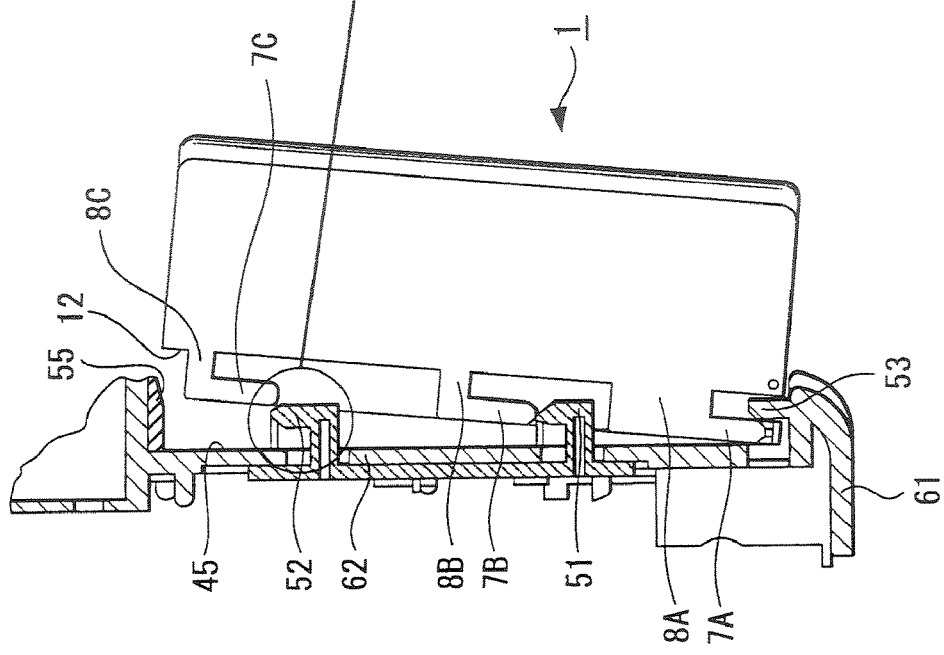

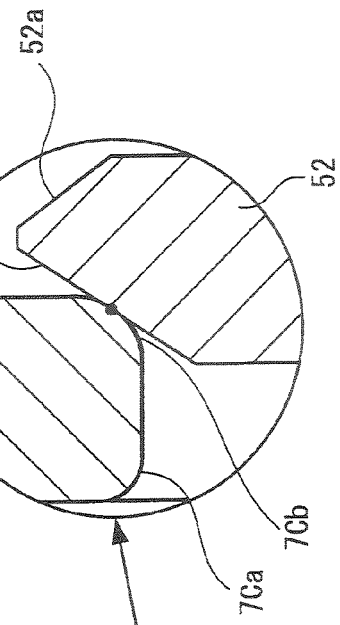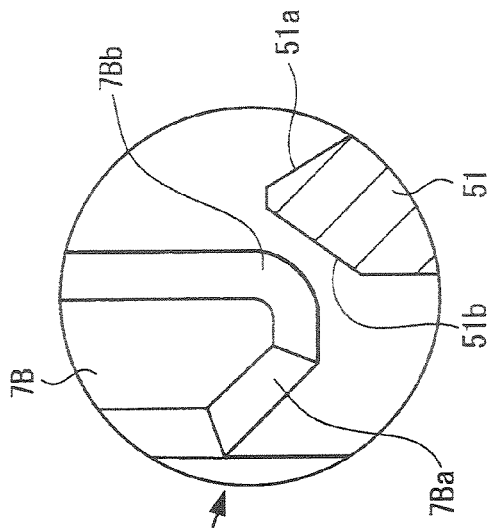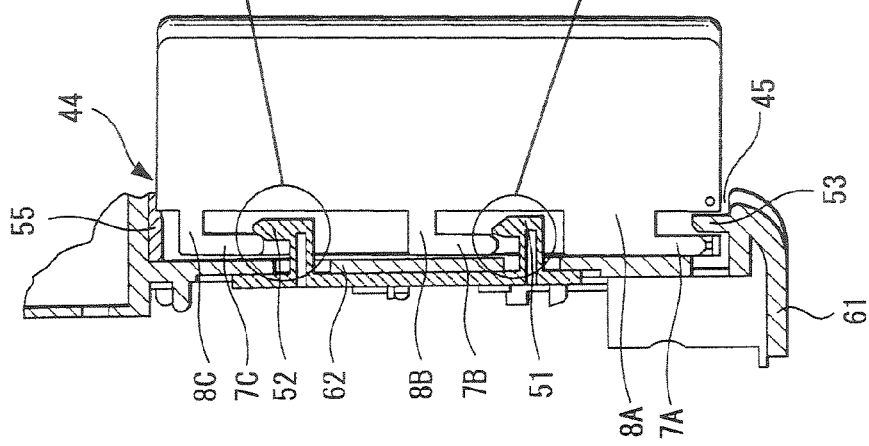

ELECTRONIC APPARATUS

CROSS REFERENCES TO RELATED APPLICATIONS

The present invention contains subject matter related to Japanese Patent Application JP 2005-373037 filed in the Japanese Patent Office on Dec. 26, 2005, the entire contents of which being incorporated herein by reference.

BACKGROUND OF THE INVENTION

1. Field of the Invention

The present invention relates to an electronic apparatus configured to have a battery unit representing a driving power source in a detachable manner.

2. Description of the Related Art

Japanese Unexamined Patent Application Publication No. 2005-190731 discloses an electronic apparatus of this kind in related art, for example. In this patent literature, there is described a battery lock mechanism of locking a battery and releasing the lock in a state where the battery representing a driving power source of an electronic apparatus is mounted on the electronic apparatus. The battery lock mechanism of the electronic apparatus described in Japanese Unexamined Patent Application Publication No. 2005-190731 includes a battery mounting portion, a lock member, and a lock release member. The battery mounting portion is provided on the rear surface side of the electronic apparatus, and the battery is detachably mounted thereon. The lock member is disposed along a rear surface side of the battery mounting portion, and a part of the lock member projects to a battery mounting surface of the battery mounting portion and engages with the battery mounted on the battery mounting portion to lock the battery. The lock release member is disposed slidably in a direction orthogonal to the battery mounting surface of the battery mounting portion and engages with the lock member to release the lock of the battery. In this battery lock mechanism, the lock member and the lock release member are disposed in L-shape.

According to the above-described electronic apparatus, the battery lock mechanism can be disposed in a marginal space between an external case and an inner structure portion in the electronic apparatus, thereby the electronic apparatus being small-sized (paragraph [0005] of the specification).

Further, Japanese Unexamined Patent Application Publication No. 2005-190929 discloses another example of an electronic apparatus of this kind in related art, for example. In this patent literature, there is described a battery unit and an electronic apparatus operated by the battery unit. The electronic apparatus described in Japanese Unexamined Patent Application Publication No. 2005-190929 includes a battery storing chamber in which the battery unit is stored. The battery unit includes a case having a width, thickness and length, a rechargeable battery portion provided inside the case, and a battery-side terminal provided on a surface of the case and connected to the rechargeable battery portion. The battery storing chamber has a width corresponding to the width of the case, a height corresponding to the thickness of the case, and a depth corresponding to the length of the case. Further, the battery storing chamber includes a storing-chamber-side terminal that contacts with the battery-side terminal in a state where the battery unit is inserted with a direction of the length thereof being parallel with a direction of the depth. Guide grooves extending in the length direction are provided at both side positions in the width direction of the case of the battery unit. The battery storing chamber is provided with projections that engage with the guide grooves and determine a position of the case in the thickness direction, that is, in the height direction in this battery storing chamber.

According to the electronic apparatus of such configuration, two or more kinds of battery units each having a different height of a case, more specifically, each having different capacity, can be stored in the battery storing chamber (paragraph [0005] of the specification).

However, in the case of the battery lock mechanism of the electronic apparatus (first related-art example) described in Japanese Unexamined Patent Application Publication No. 2005-190731, the battery mounting portion provided on the rear surface side of the electronic apparatus communicates with the rear surface side and lower surface side. Therefore, the battery can be attached to the battery mounting portion by inserting the battery upward or obliquely upward, and the battery can be detached from that portion by pulling out the battery downward or obliquely downward. FIG. 1 is an explanatory diagram for explaining a battery mounting structure of the electronic apparatus according to Japanese Unexamined Patent Application Publication No. 2005-190731.

A battery mounting portion 101 is formed in the lower part of the rear surface of an electronic apparatus 100 as a concave portion having approximately the same size corresponding to a size of a battery 300. In a rear surface 100a of the electronic apparatus 100 that is a bottom surface of the battery mounting portion 101, there are provided two engagement claws in two rows in a longitudinal direction, in other words, four engagement claws 102 in total, each having a claw portion projecting downward to engage and hold the battery 300 by engaging with an engagement convex portion 301 of the battery 300. Further, a stopper member 103 is provided on a bottom surface 100b of the electronic apparatus 100 so that the battery 300 mounted on the battery mounting portion 101 is prevented from dropping off. The stopper member 103 can slide in an anterior-posterior direction of the electronic apparatus 100 and can project from a rear surface thereof by a predetermined length, and the projected portion is positioned at the lower part of the battery 300 in such projected state so that the battery 300 is prevented from dropping off downward.

Accordingly, not only the stopper member 103 and mechanism to slide the stopper member 103 may be needed in the first example of related art, but also the stopper 103 may be operated by mistake since the stopper member 103 is exposed to the bottom surface 100b of the electronic apparatus 100. In such case, there is a possibility that the battery 300 falls off by dropping out of the battery mounting portion 101 due to its own weight. In addition, a fixing screw portion for a tripod is generally provided in the bottom surface 100b of the electronic apparatus 100, and so there is such a problem that operation of slidably moving the stopper member 103 may be impossible or may be extremely difficult in many cases in the electronic apparatus 100 in the state of the tripod being attached.

Also, in the case of the electronic apparatus (second related-art example) which is described in Japanese Unexamined Patent Application Publication No. 2005-190929, the electronic apparatus is configured such that a battery storing chamber provided on the rear surface side of the electronic apparatus is open only on the rear surface side. The battery can be attached by inserting the same into the battery storing chamber from a lateral direction, and similarly the battery can be detached by pulling out the battery in the lateral direction. FIG. 2 is an explanatory diagram for explaining a battery mounting structure of the electronic apparatus according to Japanese Unexamined Patent Application Publication No. 2005-190929.

A battery storing chamber 111 is formed in a middle part on the rear surface of an electronic apparatus 110 as a concave portion having a slightly larger length than that of the battery 300. The battery storing chamber 111 is formed such that a length in the widthwise direction is set to the length corresponding to a width of the battery 300, but a length in the lengthwise direction is set slightly longer than the length of the battery 300. Further, in a rear surface 110a of the electronic apparatus 110 that is a bottom surface of the battery storing chamber 111, there are provided two engagement claws in two rows in a longitudinal direction, in other words, four engagement claws 112 in total, each having a claw portion projecting upward to engage and hold the battery 300.

The battery 300 is attached to and detached from the battery storing chamber 111 as follows, for example. First, the battery 300 is fit into the upper part of the battery storing chamber 111 by moving the battery 300 from the lateral direction to be mounted. Next, the battery 300 is slid downward by a distance S in the battery storing chamber 111 such that four engagement convex portions 301 of the battery 300 are engaged with the four engagement claws 112 in the battery storing chamber 111. Accordingly, the battery 300 is engaged and held in the lower part of the battery storing chamber 111 with the four engagement claws 112 being engaged with engagement convex portions 301, thereby the battery 300 being prevented from dropping off. On the other hand, the battery 300 is detached with operation opposite to that of attaching the battery 300, and the battery 300 can be detached easily by pulling out the battery 300 in the lateral direction after sliding the battery 300 upward and releasing the engagement between the four engagement claws 112 and engagement convex portions 301.

However, in the case of the second related-art example, it is necessary to slide the battery 300 upward and downward by the distance S within the battery storing chamber 111. Accordingly, the length of the battery storing chamber 111 becomes longer by the sliding mount of the battery 300, and there has been such a problem that the whole electronic apparatus 110 becomes larger since a height of the electronic apparatus becomes higher as much as the length of the battery storing chamber 111 becomes longer.

SUMMARY OF THE INVENTION

In the electronic apparatuses of related art, there is a possibility that the battery 300 falls down by dropping out of the battery mounting portion 101 due to its own weight, in the case where the stopper member 103 is operated by mistake. Further, the operation of sliding the stopper member 103 becomes almost impossible or extremely difficult in such a state that the electronic apparatus 100 is attached to the tripod. Furthermore, in the electronic apparatus of related art, the whole electronic apparatus 110 becomes larger, since the height of the electronic apparatus becomes higher as much as the length of the battery storing chamber 111 becomes longer.

An electronic apparatus according to an embodiment of the present invention includes a case body having a battery storing portion formed of a concave portion whose shape is approximately corresponding to an external shape of a battery unit and a sliding member slidably supported on a surface of the case body on the opposite side to the battery storing portion. The battery storing portion has a width corresponding to a width of the battery unit, a length corresponding to a length of the battery unit inserted by turning with one side in the length direction as the center, and a body-side connection terminal connected to a connection terminal of the battery unit turned and inserted into the battery storing portion. Further, the sliding member includes one or more engagement claws penetrating through the case body, projecting to the inside of the battery storing portion, and capable of being engaged with engagement convex portions provided in the battery unit, and a biasing member causing the one or more engagement claws to be biased away from the body-side connection terminal and engaged with the engagement convex portions.

According to an embodiment of the present invention, there is provided an electronic apparatus in which a battery storing portion is formed into a size corresponding to a battery such that the battery can be mounted on and removed from the battery storing portion without a sliding movement of the battery, thereby the whole electronic apparatus being small-sized and light in weight.

BRIEF DESCRIPTION OF THE DRAWINGS

FIGS. 11A and 11B are diagrams explaining operation of a battery storing portion in an electronic apparatus according to an embodiment of the present invention, in which FIG. 11A is an explanatory diagram when starting insertion of a battery unit, and FIG. 11B is an explanatory diagram showing a relevant part of FIG. 11A in an enlarged manner;

FIGS. 12A and 12B are diagrams explaining operation of a battery storing portion in an electronic apparatus according to an embodiment of the present invention, in which FIG. 12A is an explanatory diagram in the middle of inserting the battery unit, and FIG. 12B is an explanatory diagram showing a relevant part of FIG. 12A in an enlarged manner;

FIGS. 13A and 13B are diagrams explaining operation of a battery storing portion in an electronic apparatus according to the embodiment of the present invention, in which FIG. 13A is an explanatory diagram when locking the battery unit, and FIG. 13B is an explanatory diagram showing a relevant part of FIG. 13A in an enlarged manner;

FIGS. 14A to 14C are diagrams explaining operation of a battery storing portion in an electronic apparatus according to an embodiment of the present invention, in which FIG. 14A is an explanatory diagram when detaching the battery unit, and FIGS. 14B and 14C are explanatory diagrams showing a relevant part of FIG. 14A, respectively in an enlarged manner;

FIGS. 21A and 21B are diagrams showing a battery unit suitably used for an electronic apparatus according to an embodiment of the present invention, in which FIG. 21A is a bottom perspective view, and FIG. 21B is a front view; and FIGS. 22A through 22D are diagrams showing a battery unit suitably used for an electronic apparatus according to an embodiment of the present invention, in which FIG. 22A is a plan view, FIG. 22B is a bottom view, FIG. 22C is a left side view, and FIG. 22D is a right side view.

DESCRIPTION OF THE PREFERRED EMBODIMENTS

An electronic apparatus, in which a battery unit can be attached to and detached from the electronic apparatus without difficulty and the whole apparatus can be small-sized and light in weight, is obtained with a simplified structure.

Figure 19:
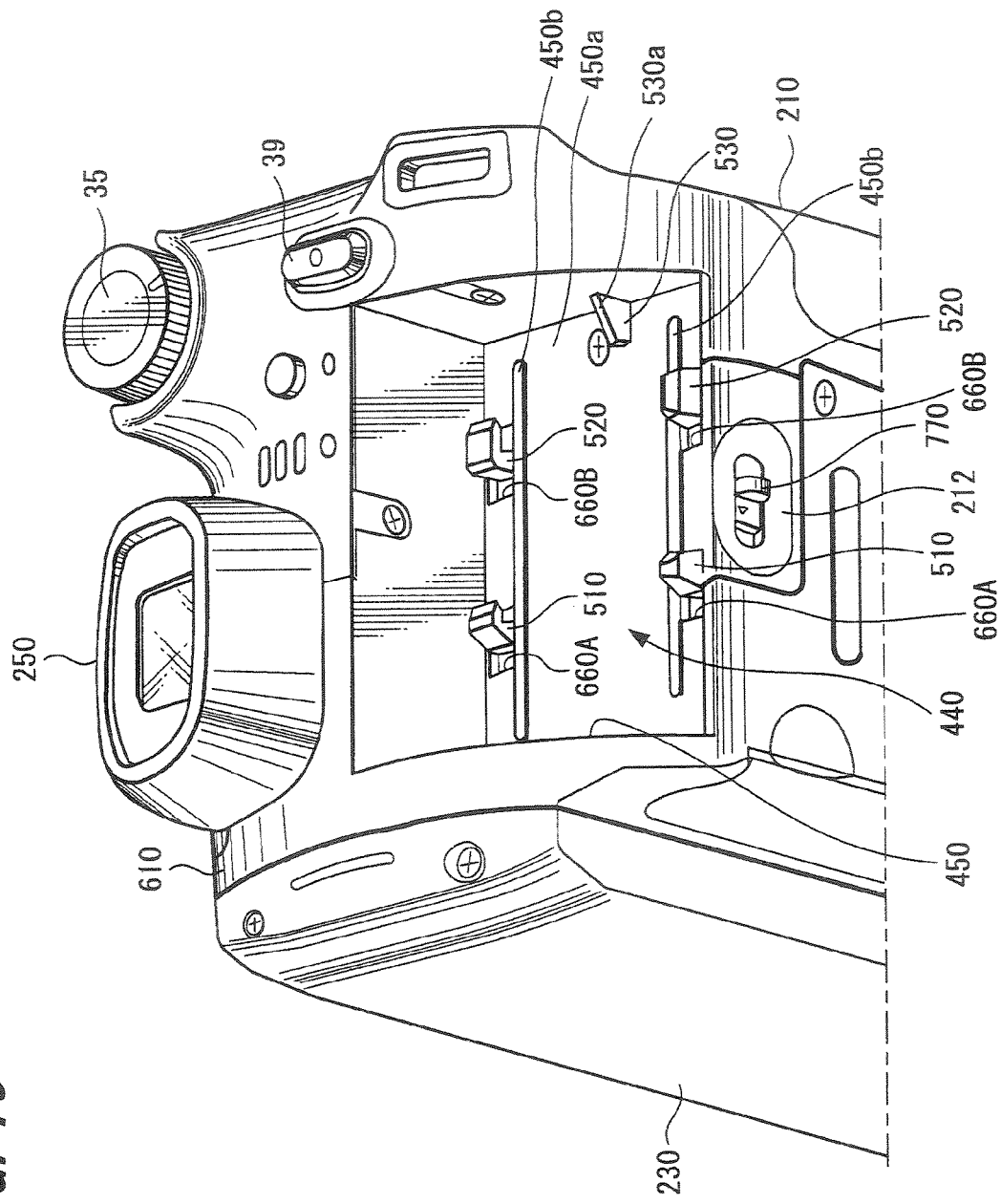
FIG. 19 is an explanatory diagram of a battery storing portion of the digital video camera showing in an enlarged manner a second example of an imaging apparatus representing an electronic apparatus according to another embodiment of the present invention.
Figure 20:
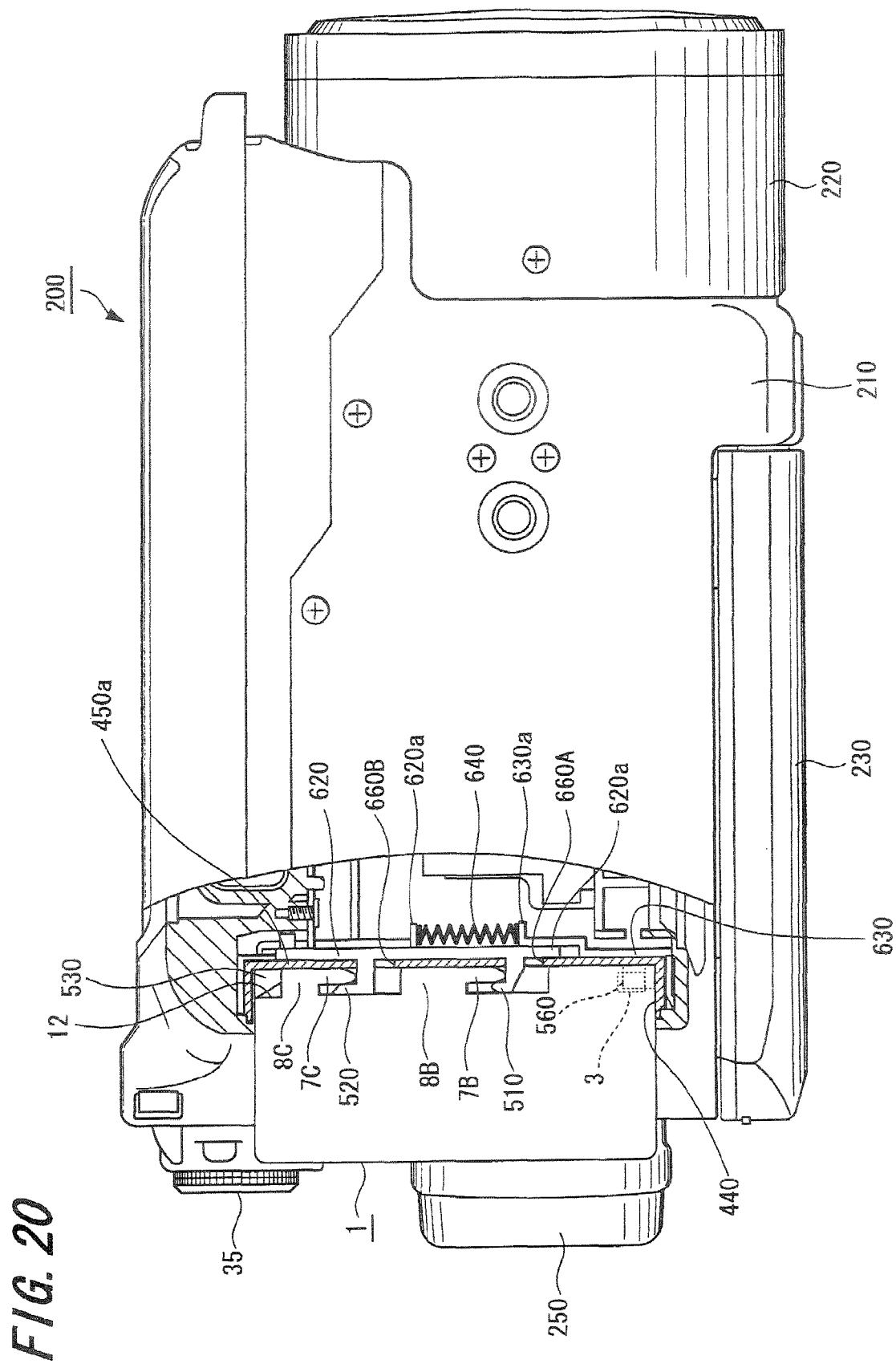
FIG. 20 is an explanatory diagram of a battery storing portion of the digital video camera showing in section a second example of an imaging apparatus representing an electronic apparatus according to another embodiment of the present invention.
Figure 21A:
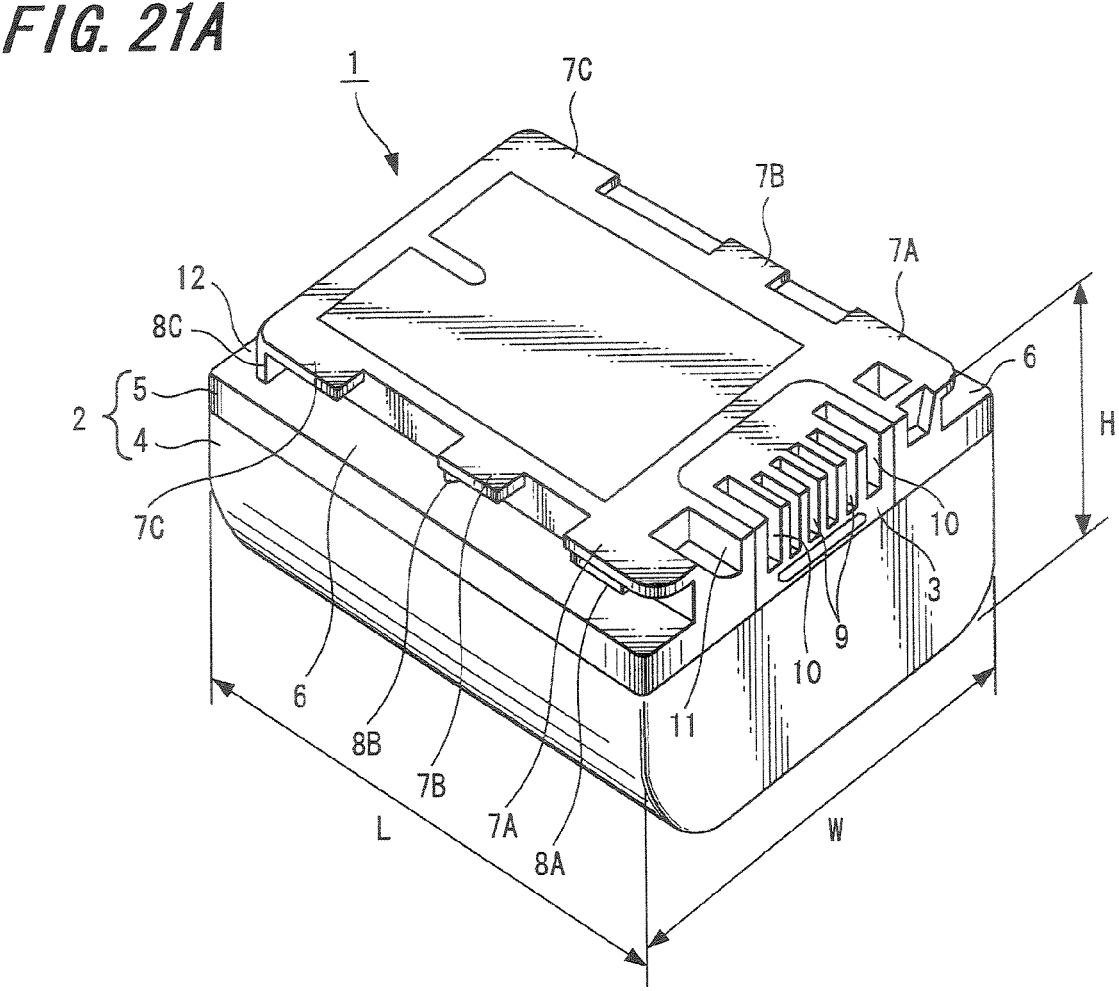
Figure 21B:
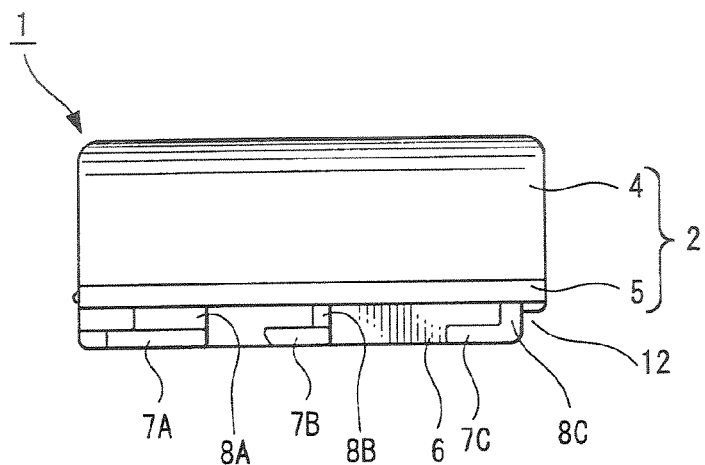
Figure 22A:
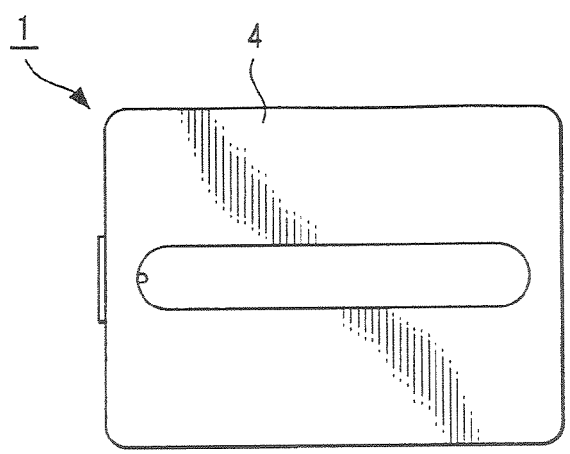
Figure 22B:
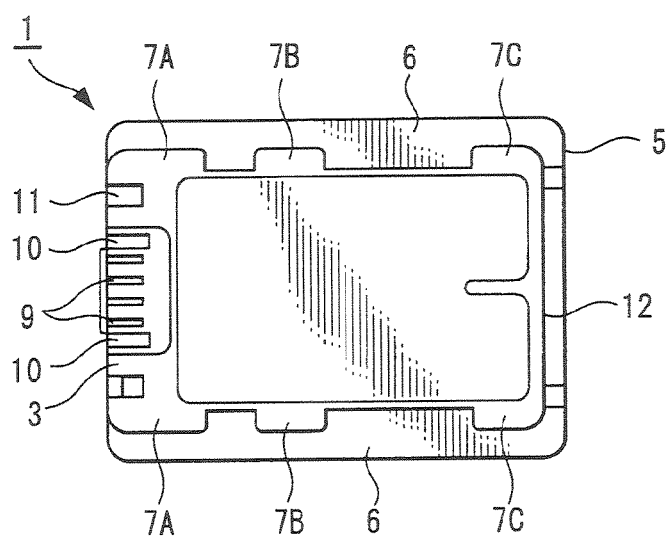
Figure 22C:
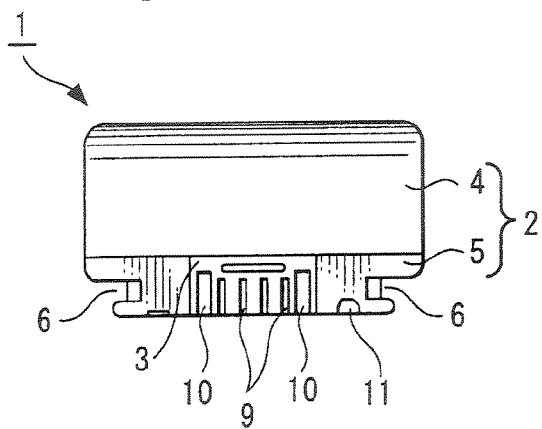
Figure 22D:
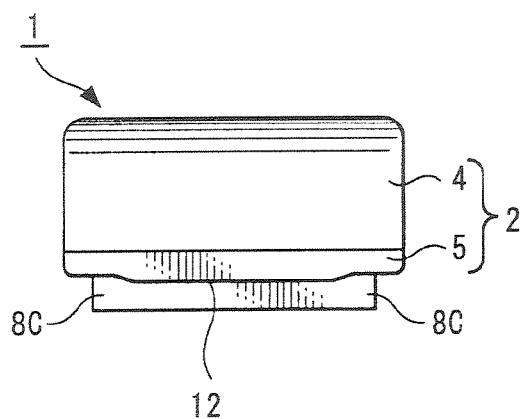

FIGS. 3 through 22 are diagrams showing embodiments of the present invention. Specifically, FIGS. 3 through 6 are diagrams of a digital video camera showing a first example of an electronic apparatus according to an embodiment of the present invention: a front perspective view, a rear perspective view, a front view, and a rear view, respectively. FIGS. 7 through 10 are diagrams of a battery storing portion: an exploded perspective view, a front view, a front perspective view, and a rear perspective view, respectively. FIGS. 11 through 14 are explanatory diagrams showing a state of mounting a battery unit on a battery storing portion, respectively. FIGS. 15 through 18 are diagrams of a digital video camera showing a second example of an electronic apparatus according to an embodiment of the present invention: a front perspective view, a rear perspective view, and explanatory diagrams showing a mounting and removing operation of a battery unit, respectively. FIG. 19 is an explanatory diagram showing a relevant part on the rear side, and FIG. 20 is a partially sectional bottom view. Further, FIGS. 21A and 21B, and FIGS. 22A through 22D are diagrams showing a first example of a battery unit relating to an electronic apparatus according to an embodiment of the present invention: a perspective view, a front view, a plan view, a bottom view, a left side view, and a right side view, respectively.

Embodiment 1

First, a first example of a battery unit suitably used for an imaging apparatus representing an electronic apparatus according to an embodiment of the present invention is explained with reference to FIGS. 21A and 21B, and FIGS. 22A through 22D. A battery unit 1 is configured to have a case 2, a rechargeable battery portion and control circuit substrate (not illustrated) provided inside the case 2, a battery-side connection terminal 3 provided in the case 2, and the like. The case 2 is constructed in the form of a block that is formed into an approximately rectangular parallelepiped unit in which L represents a size in the lengthwise direction; W represents a size in the width direction; and H represents a size in the height direction. The case 2 includes a body portion 4 in which one surface is open, and a base portion 5 that closes the opening portion of the body portion 4. Further, the connection terminal 3 is provided approximately in the center of a short side on one end in the lengthwise direction of the base portion 5.

The body portion 4 of the battery unit 1 is formed into a shallow dome shape in which both ends in the width direction of a surface on the opposite side to the open surface are rounded into a circular arc shape along the longer sides. A rechargeable battery portion having one or more battery cells, a control circuit substrate having a micro computer including, for example, a CPU, RAM and ROM, an interface, and the like are stored in a space of the body portion 4. The battery unit 1 is configured such that the rechargeable battery portion and the control circuit substrate are electrically connected to each other and also connected to the connection terminal 3, thereby enabling data communication on information such as battery capacity and characteristics thereof to be performed with an external electronic apparatus.

Guide grooves 6, 6 are provided continuously in the lengthwise direction on both sides of width direction in the base portion 5 of the battery unit 1. The guide grooves 6, 6 determine a position of the battery unit in the direction of the thickness H in a battery storing portion of the electronic apparatus by engaging with engagement claws provided in the battery storing portion. The left and right guide grooves 6, 6 are formed symmetrically, and cutout portions are provided at appropriate intervals in the lengthwise direction to form three convex sections (engagement convex portions) 7A, 7B, 7C showing a specific example of engagement convex portions provided in each guide groove 6. Convex portions 8A, 8B, 8C respectively projecting outward in the width direction are provided in the three convex sections 7A, 7B, 7C on the opposite side to the connection terminal 3.

Among the three convex portions 8A, 8B, 8C, the first convex portion 8A close to the connection terminal 3 and the second convex portion 8B positioned in the middle are formed to have smaller projection sizes than the first convex section 7A and second convex section 7B, respectively. On the other hand, the third convex portion 8C positioned farthest from the connection terminal 3 is formed to have the same projection size as the third convex section 7C. Further, a stepped concave portion is provided across the whole length in the width direction on the opposite side to the connection terminal 3 in the base portion 5.

A plurality of electrode slits 9, 9 having electrodes disposed inside and two positioning slits 10, 10 disposed on both sides of the plurality of electrode slits 9 are provided in the connection terminal 3. Those electrode slits 9 and positioning slits 10 are formed into groove-shaped slits continuing from the front surface to the bottom surface at a corner portion of the base portion 5. Furthermore, an identification portion 11 for identifying the battery unit 1 is provided on one side of the connection terminal 3 in the base portion 5.

Next, a digital video camera 20, showing a first example of an imaging apparatus representing a specific example of an electronic apparatus according to an embodiment of the present invention, is explained with reference to FIGS. 3 through 14. The digital video camera 20 uses a tape cassette including a magnetic tape as an information storage medium, and an optical image is converted into an electrical signal by using a CCD (solid-state imaging device) showing a specific example of an imager. Information on that image can be recorded on the magnetic tape and displayed on a display unit made of a flat panel such as a liquid crystal display.

However, the information storage medium used in the imaging apparatus showing the specific example of the electronic apparatus according to an embodiment of the present invention is not limited to the magnetic tape shown in this embodiment. For example, disk-shaped recording media such as a recordable optical disk, magneto-optical disk and magnetic disk, which are DVD-R, DVD-RW, DVD-RAM, MO, FD and others, can be used. As the electronic apparatuses using those disk-shaped recording media, there are provided: an optical disk video camera in the case of using the optical disk, a magneto-optical disk still camera in the case of using the magneto-optical disk, and a magnetic disk electronic diary in the case of using the magnetic disk, for example.

The digital video camera 20 includes: an external case 21, a tape drive unit, a control circuit, a lens unit 22, a display unit 23, and the like. The external case 21 shows a specific example of a case body made of a casing constituting an external shape. The tape drive unit is stored inside the external case 21 and performs recording (write) and reproduction (read) of an information signal by driving and running the magnetic tape in the tape cassette detachably mounted. The control circuit drives and controls the tape drive unit, for example. The lens unit 22 captures an object image with light that is lead to the CCD. The display unit is attached to the external case 21 in a turnable manner.

As shown in FIGS. 3 through 6, the external case 21 is made of an approximately rectangular-parallelepiped hollow case in which the lengthwise direction is set in an anterior-posterior direction and which is used in a state of rising up in the width direction. The lens unit 22 is arranged in the upper part of the external case 21 in a state of exposing an object lens 24 that is an imaging lens of a lens system to a front surface. The lens unit 22 is attached to the external case 21 in a state of an optical axis of the lens system being directed in the horizontal direction. Although not illustrated, the CCD is attached to the rear of the lens system 22 inside the external case 21. Further, a viewfinder unit 25 to see the image of the object input from the lens unit 22 is disposed behind the lens unit 22.

An opening portion to expose an accessory shoe where an accessory such as a video light and external microphone is detachably mounted is provided in the upper part of the external case 21. The accessory shoe is disposed right in front of the viewfinder unit 25, and is normally covered with a shoe cap 27 in a detachable manner to open and close the opening portion. In addition, a light emitting portion 28 of a flash unit, a built-in stereo microphone 29 and the like are disposed on the front surface of the external case 21.

Figure 1:
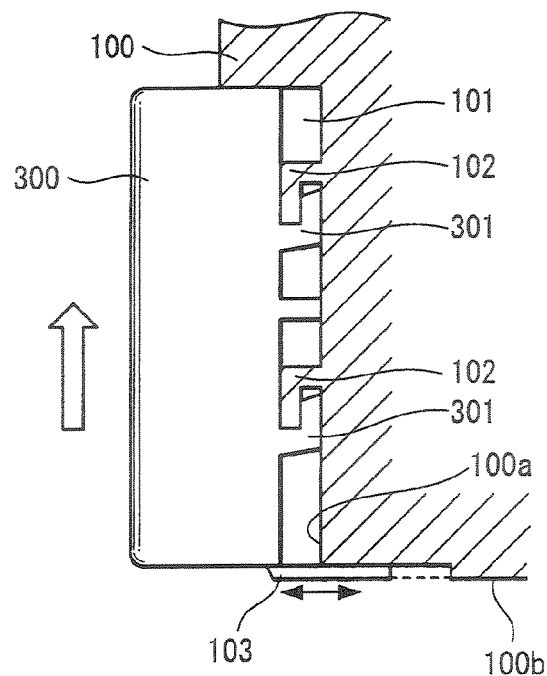
FIG. 1 is an explanatory diagram showing a first example of a battery storing portion in related art.
Figure 2:
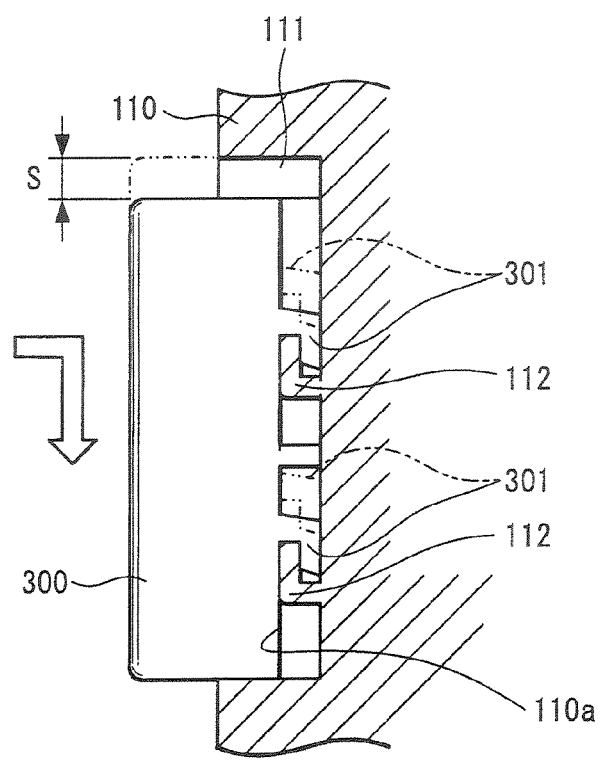
FIG. 2 is an explanatory diagram showing a second example of a battery storing portion in related art.
Figure 3:
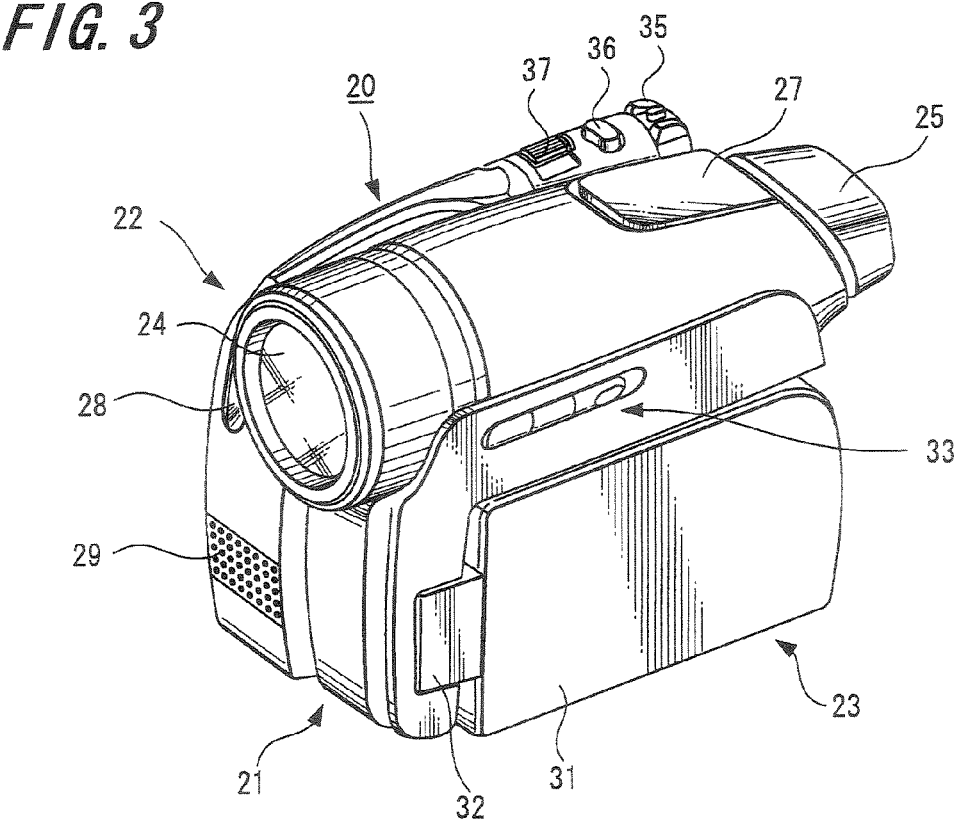
FIG. 3 is a front perspective view of a digital video camera showing a first example of an imaging apparatus representing an electronic apparatus according to an embodiment of the present invention.

As shown in FIG. 3, the display unit 23 is attached to a lateral surface of the external case 21 in a manner capable of changing a posture thereof. The display unit 23 includes: a flat panel made of a flat board-shaped liquid crystal display or the like (not illustrated), a panel case 31 where the flat panel is stored, and a panel support portion 32 to support the panel case 31 in a manner capable of changing the posture on the external case 21. The panel support portion 32 has a horizontal turn portion capable of turning the panel case 31 in the horizontal direction by approximately 90° with a vertical axis as the center of the turning movement and an anterior-posterior turn portion capable of turning the panel case 31 in the anterior-posterior direction by approximately 180° with a horizontal axis as the center of the turning movement.

Accordingly, the display unit 23 can arbitrarily be brought into a state of the external case 21 being stored on the lateral surface as shown in FIG. 3; a state of turning the panel case 31 by 90° so that the flat panel faces backward; a state of turning the panel case 31 by 180° from that state so that the flat panel faces forward; and a state at any position between those states. An operation portion 33 including a plurality of operation buttons is provided on the lateral surface of the external case 21 above the display unit 23.

Figure 4:
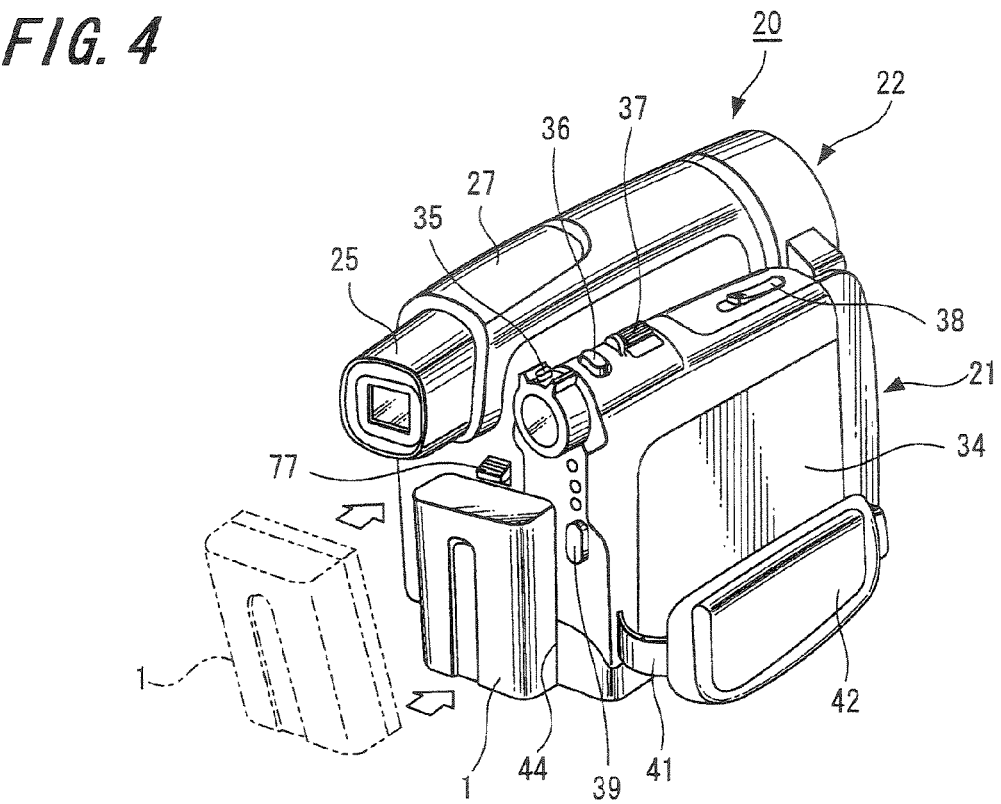
FIG. 4 is a rear perspective view of a digital video camera showing a first example of an imaging apparatus representing an electronic apparatus according to an embodiment of the present invention.
Figure 5:
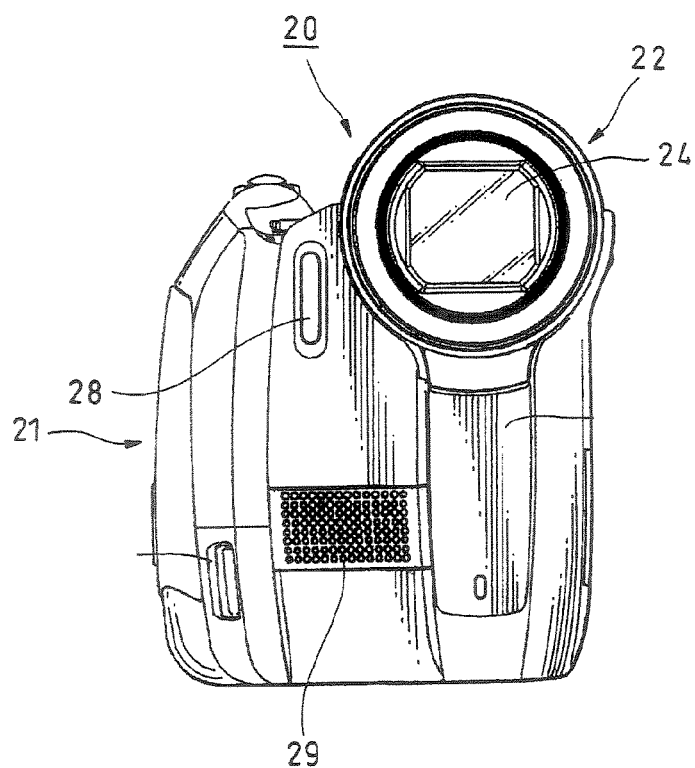
FIG. 5 is a front view of the digital video camera shown in FIG. 3.

As shown in FIG. 4, an opening-and-closing deck cover 34 capable of covering a tape deck, where the tape cassette is detachably mounted, is provided to be open and closed on a lateral surface of the external case 21 that is the opposite side to the display unit 23. The tape deck is such apparatus as follows. The tape deck performs recording (write) and/or reproduction (read) of an information signal by running a magnetic tape at a predetermined speed after feeding the mounted tape cassette to a predetermined position and pulling out the magnetic tape to be loaded on a rotating drum or the like. The deck cover 34 that covers the tape deck is provided with a power switch 35, a shutter button 36, a zoom button 37, an opening and closing switch 38, a record button 39, and the like. The power switch 35 also serves as a mode selection switch. The shutter button 36 is provided to capture a still image. The zoom button 37 is provided to continuously magnify (telescope) or reduce (wide) an image within a predetermined range. The opening and closing switch 38 is provided to lock and unlock the deck cover 34. The record button 39 is provided to capture a moving image.

The power switch 35 has a function of switching the power ON/OFF by turning operation and a function of switching a mode among a plurality of functional modes repeated by turning the power switch in the power ON state. Further, a hand belt 41 is attached to the deck cover 34, and a hand pad 42 is attached to the hand belt 41. The hand belt 41 and the hand pad 42 are used to support a user's hand grasping the external case 21, thereby preventing the digital video camera 20 from being dropped.

Figure 6:
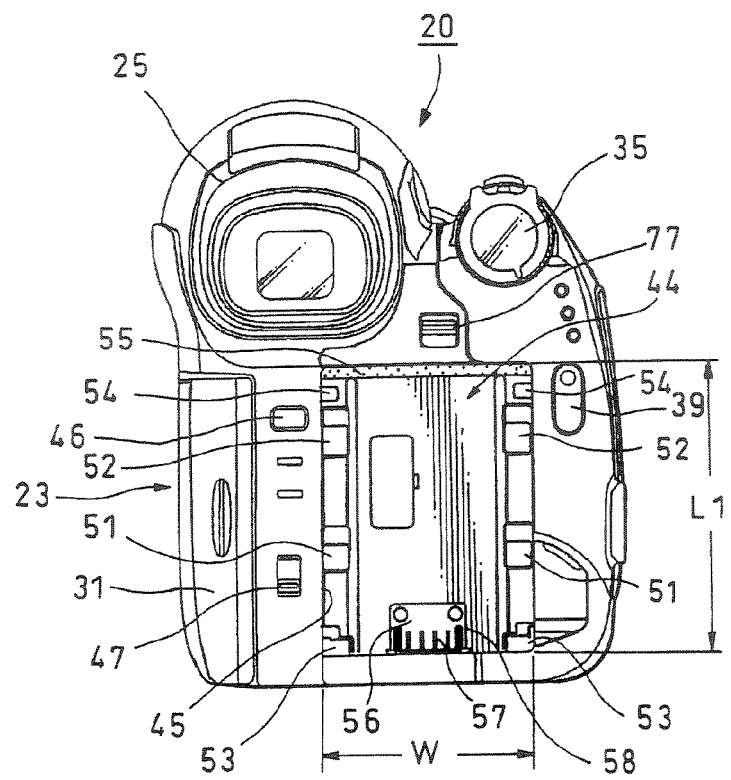
FIG. 6 is a rear view of the digital video camera shown in FIG. 3.

As shown in FIGS. 4 and 6, on the rear surface of the external case 21 is provided a battery storing portion 44 where the battery unit 1 that is a portable power source is detachably mounted. The battery storing portion 44 is disposed below the approximate center on the rear surface of the external case 21 and is open on the rear surface side. The record button 39 is disposed on the right side of the battery storing portion 44 on the rear surface of the external case 21, and a light emitting button 46 for the flush unit and a night shot switch 47 are disposed on the left side.

The battery storing portion 44 includes a rectangular concave portion 45 having a size approximately the same as that of the battery unit 1. Specifically, the length in the width direction is approximately the same, but the length in the lengthwise direction is obtained by adding the length of a space to the length of the battery unit 1. The space is provided to store the battery unit 1 in the concave portion 45 by turning the battery unit 1 with one side at an end in the lengthwise direction being the center of the turning movement. The concave portion 45 is provided such that a lengthwise direction thereof is directed in the upper-lower direction. In the concave portion 45 are provided two pairs, that is, total four pieces of engagement claws 51, 52; two convex portions 53, 53; two positioning convex portions 54, 54; an elastic holding member 55; a body-side connection terminal 56 of the electronic apparatus; and the like. Each of the above two pairs includes a first engagement claw 51 and a second engagement claw 52 movable in the upper-lower direction. The elastic holding member 55 elastically supports the battery unit 1; The body-side connection terminal 56 is capable of being electrically connected to the connection terminal 3 of the battery unit 1.

Figure 10:
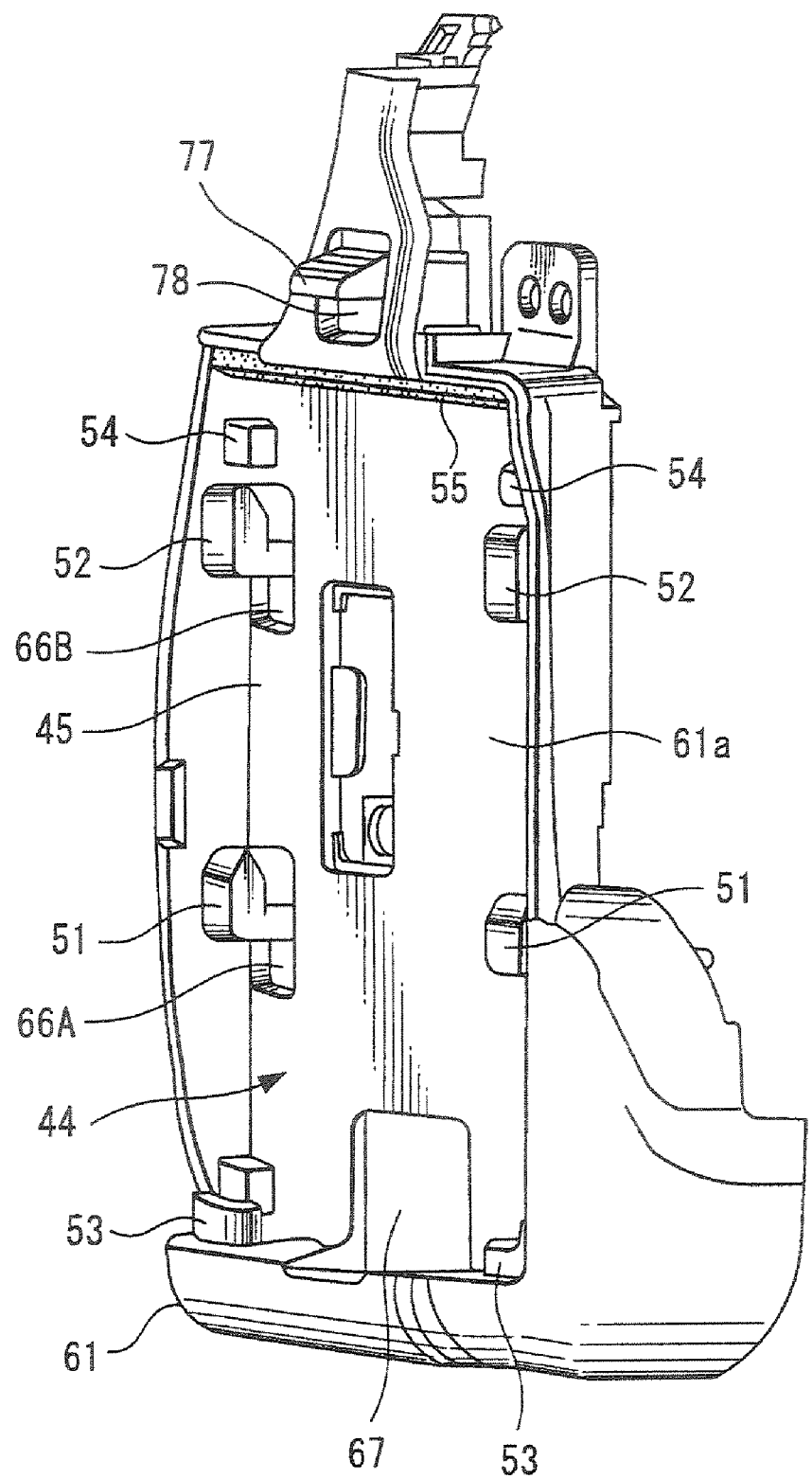
FIG. 10 is an explanatory diagram when the battery storing portion of the digital video camera shown in FIG. 3 is viewed obliquely from the outside.

As shown in FIGS. 6 and 10, two pairs, that is, total four pieces of the engagement claws 51, 52 are disposed at predetermined intervals at positions along longer sides on both sides in the width direction and in the middle in the lengthwise direction in the concave portion 45. Furthermore, the convex portions 53 are disposed at both corner portions in the lower end of the concave portion 45, respectively. The body-side connection terminal 56 is disposed approximately in the middle part between those two convex portions 53, 53. The body-side connection terminal 56 has a shape and structure that corresponds to the connection terminal 3 of the battery unit 1. More specifically, the body-side connection terminal 56 has electrodes 57 whose number is corresponding to the number of electrodes in the connection terminal 3 of the battery unit 1. The electrodes 57 are capable of being inserted into the terminal slits 9, respectively. Further, the body-side connection terminal 56 includes two convex sections 58 capable of being inserted into the two positioning slits 10, 10 of the battery unit 1.

The elastic holding member 55 that is a holding mechanism for holding the battery unit 1 stored in the battery storing portion 44 is provided on an inner surface on a shorter side at the upper end of the concave portion 45 in a manner opposing to the body-side connection terminal 56. The elastic holding member 55 is provided to bias the battery unit 1 inserted in the battery storing portion 44 with elastic force of rubber, spring and the like to be elastically held. Accordingly, the battery unit is elastically held after the engagement between the four engagement claws 51, 52 of a sliding member 62 and the four convex sections 7B, 7C of the battery unit 1 is released, thereby preventing the battery unit 1 from dropping off by mistake.

As the elastic holding member 55, rubber or a rubber-like elastic body such as plastic having elasticity is suitably used, for example, and such material is formed into a plate shape and fixed to the inner surface of the concave portion 45 using adhesive. However, the elastic holding member 55 is not limited to those described in this embodiment and may be formed into a stick shape instead of the plate shape and fixed to the center on the upper side of the concave portion 45, for example. Moreover, material of the elastic holding member 55 is also not limited to rubber or plastic, and not only a plate spring and coil spring but also a wire rod having spring property and the like can be used, for example.

Further, a position of the elastic holding member 55 is also not limited to the position described in this embodiment. For example, the elastic holding member 55 can be provided at three positions in total, including those on left and right lateral surfaces continuing on both sides of the above-described surface in addition to the position of this embodiment.

Further, the positioning convex portions 54 are provided above the two second engagement claws 52, 52 at positions farther than the engagement claws 51, 51 from the body-side connection terminal 56 in the concave portion 45, respectively. Those positioning convex portions 54, 54 are provided to control an inclination and shift in the left-right direction of the battery unit 1 inserted in the battery storing portion 44 so that the connection terminal 3 is securely and electrically connected to the body-side connection terminal 56.

FIGS. 7 through 10 are diagrams showing constituents and the like constituting the battery storing portion 44. The battery storing portion 44 is configured to have a rear panel 61, the sliding member 62, a support plate 63, a coil spring 64, and the like. The rear panel 61 constitutes a part of the external case 21. The sliding member 62 is slidably attached in the upper-lower direction on the inner surface of the rear panel 61. The support plate 63 slidably supports the sliding member 62 on the rear panel 61. The coil spring 64 shows a specific example of a biasing member to bias the sliding member 62 in a direction away from the body-side connection terminal 56.

The rear panel 61 is provided to cover an opening portion on the rear surface of the external case 21 and includes an operation hole 78 to expose an operation portion for slidably moving the sliding member 62 in the upper-lower direction, in addition to the concave portion 45 and necessary holes for switch, button and the like where the record button 39 and the like are penetrated. The operation hole 78 is disposed at a position above the concave portion 45 and approximately at the center in the width direction of the concave portion 45 in the rear panel 61. Four through-holes 66A, 66B where the two pairs, that is, total four pieces of engagement claws 51, 52 are respectively penetrated are provided at four positions on the bottom surface 61a of the concave portion 45 of the rear panel 61. Each of the through-holes 66A, 66B is formed as a longitudinal hole extended in the upper-lower direction so that the engagement claw 51 or the engagement claw 52 can move by a predetermined distance in the upper-lower direction.

Further, an engagement hole 67 where the body-side connection terminal 56 is engaged is provided approximately at the center on the lower side of the concave portion 45 of the rear panel 61. In addition, on the rear surface of the rear panel 61 are provided a plurality of guide pins 68 to guide the sliding member 62 in the upper-lower direction for linear sliding movement.

Figure 7:
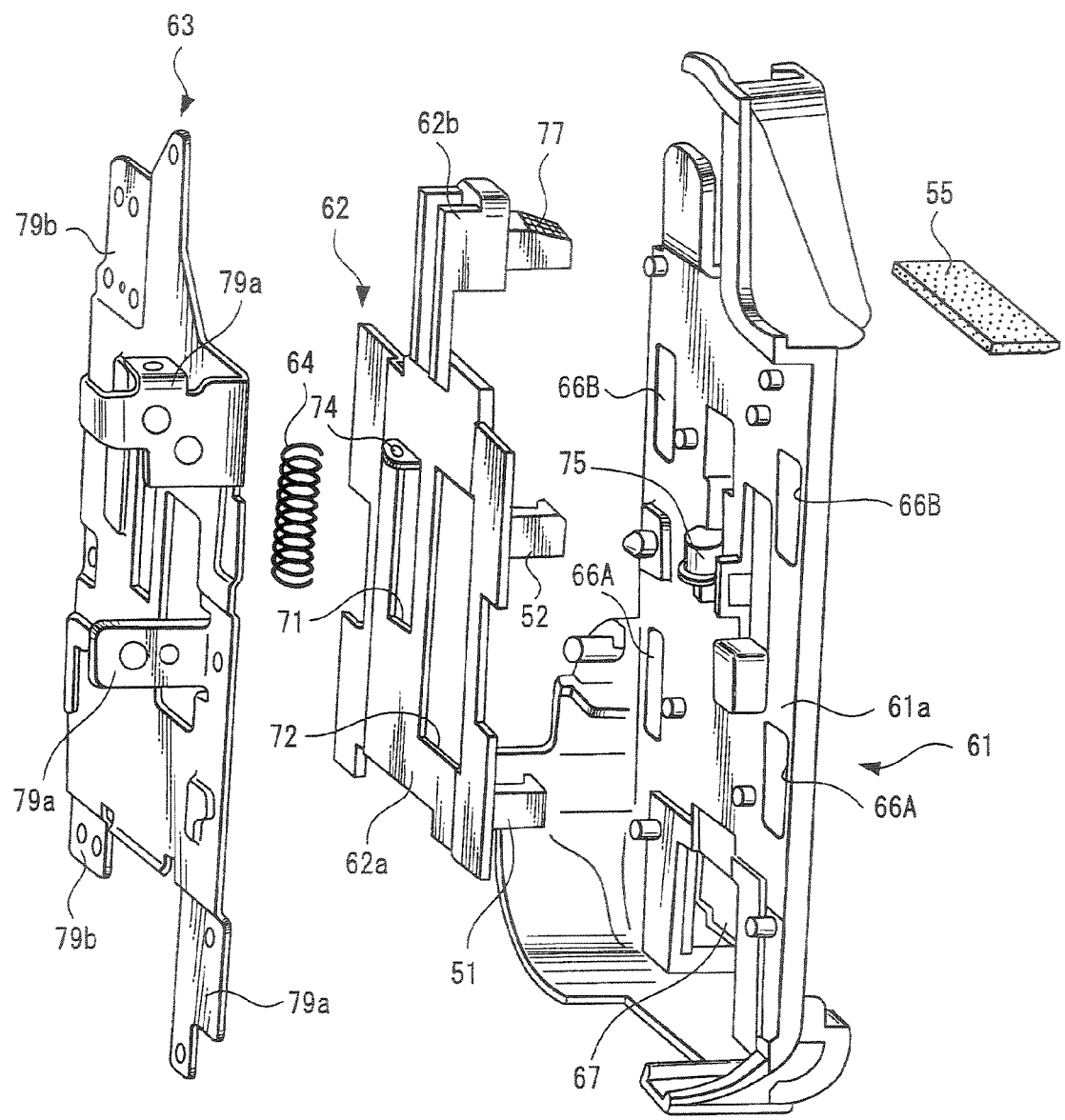
FIG. 7 is an explanatory diagram showing in an exploded manner a battery storing portion of the digital video camera shown in FIG. 3.
Figure 8:
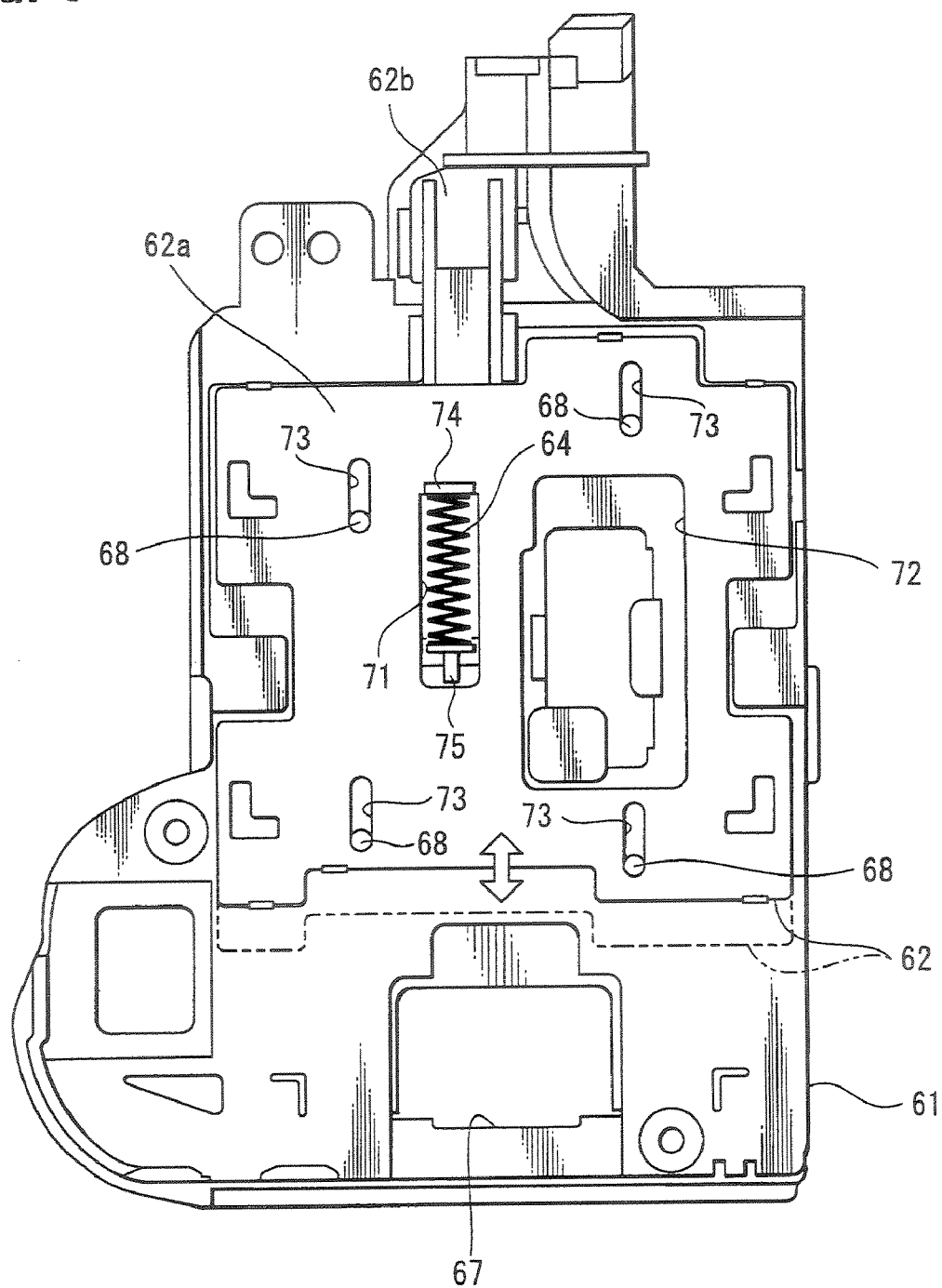
FIG. 8 is an explanatory diagram when the battery storing portion of the digital video camera shown in FIG. 3 is viewed from the inside.
Figure 9:
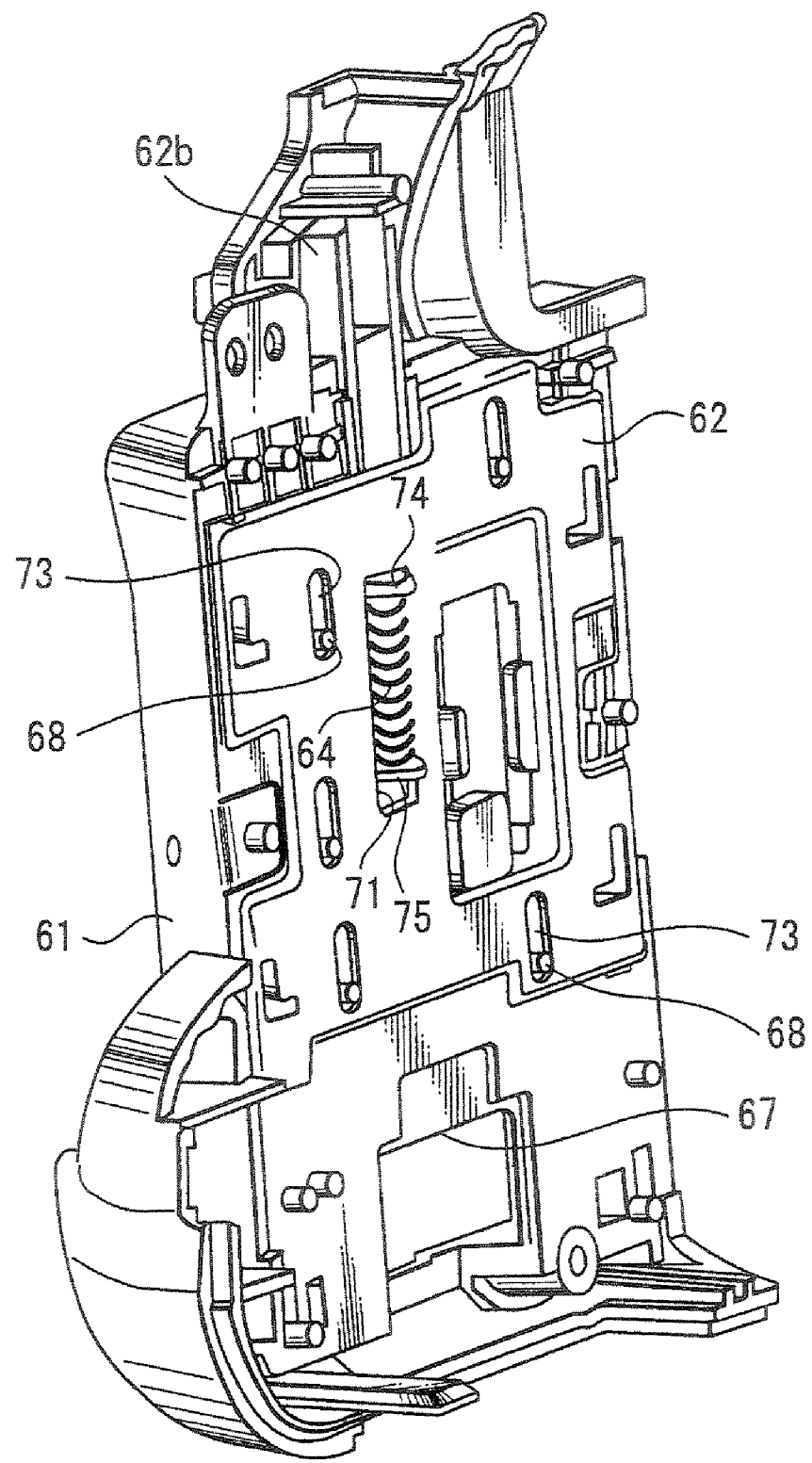
FIG. 9 is an explanatory diagram when the battery storing portion of the digital video camera shown in FIG. 3 is viewed obliquely from the inside.

The sliding member 62 has such a structure as shown in FIGS. 7 through 9. The sliding member 62 includes a sliding portion 62a made of an approximately rectangular plate that is smaller than the bottom surface of the concave portion 45 and an operation portion 62b provided continuously from the upper side of the sliding portion 62a to project upward. The four engagement claws 51, 52 are erected on one surface of the sliding portion 62a. Those four engagement claws 51, 52 are disposed correspondingly to the four convex sections 7B, 7C in the battery unit 1, and end portions of those claws and sections are formed to detachably engage with each other. Specifically, among the four engagement claws 51, 52, the first engagement claw 51 and second engagement claw 52 linearly disposed in the upper-lower direction constitute a pair, and the two pairs are provided symmetrically to be disposed at predetermined positions.

It is preferable that the two pairs, that is, total four pieces of engagement claws 51, 52 have such relationships as shown in FIGS. 11A, 11B through FIGS. 14A, 14B. In other words, preferably, such relationships as shown in those figures are obtained between the first engagement claw 51 and the second convex section 7B positioned at the center of the battery unit 1 and between the second engagement claw 52 and the third convex section 7C positioned farthest from the connection terminal 3 of the battery unit 1.

More specifically, a claw portion projecting upward provided in the top portion of the first engagement claw 51 has on the outer surface thereof an outside inclined surface 51a inclining such that a distance to the sliding portion 62a becomes shorter as a top end approaches. Also, on the inner surface thereof the claw portion has an inside inclined surface 51b inclining such that the distance to the sliding portion 62a becomes longer as the tope end approaches. On the other hand, a claw portion extending in the plane direction provided in the top portion of the second convex section 7B of the battery unit 1 detachably engaged with the first engagement claw 51 has on the outer surface thereof an outside inclined surface 7Ba inclining such that a distance to the bottom surface becomes farther as a top end approaches. Also, on the inner surface thereof the claw portion has an inside circular arc surface 7Bb formed of a circular arc having an appropriate curvature radius.

Further, a claw portion projecting upward provided in the top portion of the second engagement claw 52 has on the outer surface thereof an outside inclined surface 52a inclining such that the distance to the sliding portion 62a becomes shorter as a top end approaches. Also, on the inner surface thereof the claw portion has an inside inclined surface 52b inclining such that the distance to the sliding portion 62a becomes longer as the top end approaches. On the other hand, a claw portion extending in plane surface direction provided in the top portion of the third convex portion 7C of the battery unit 1 detachably engaged with the second engagement claw 52 has on the outer surface thereof an outside circular arc surface 7Ca formed of a circular arc having an appropriate curvature radius. Also, on the inner surface thereof the claw portion has an inside circular arc surface 7Cb similarly formed of the circular arc having the appropriate curvature radius.

Further, the outside inclined surface 51a and inside inclined surface 51b of the first engagement claw 51, and the outside inclined surface 7Ba and inside circular arc surface 7Bb of the second convex section 7B are brought in contact and separated based on a position relation or order described later on. Similarly, the outside inclined surface 52a and inside inclined surface 52b of the second engagement claw 52, and the outside inclined surface 7Ca and inside circular arc surface 7Cb of the third convex section 7C are brought in contact and separated based on the position relation or order described later on.

Further, the sliding portion 62a of the sliding member 62 includes a longitudinal hole 71 to hold the coil spring 64, a window 72 to avoid interference with other parts, and a plurality of (four in this embodiment) guide holes 73, 73 to control a sliding direction. The four guide holes 73, 73 are provided correspondingly to the four guide pins 68, 68 provided in the rear panel 61, and the four guide pins 68, 68 are inserted into the four guide holes 73, 73 respectively at the time of assembly. Accordingly, each guide pin 68 is guided by each guide hole 78 such that the sliding member 62 is relatively movable with respect to the rear panel 61 within the range of a length of the guide hole 73.

At one end in the lengthwise direction of the longitudinal hole 71 of the sliding member 62 is provided a spring bearing section 74 on the sliding side where one end of the coil spring 64 is seated. Also, at the other end in the lengthwise direction of the longitudinal hole 71 is inserted a spring bearing portion 75 of the panel side provided opposing to the spring bearing section 74. The spring bearing portion 75 is erected on the rear surface of the rear panel 61, and the coil spring 64 is interposed in a compressed state between the spring bearing portion 75 and the spring bearing section 74. The sliding member 62 is always biased in a direction away from the body-side connection terminal 56 by the spring force of the coil spring 64.

The operation portion 62b of the sliding member 62 is formed of an arm section extending in the sliding direction from one side of the sliding portion 62a, and an input convex portion 77 is provided on the top end of the arm section. The input convex portion 77 is projected in the same direction as the four engagement claws 51, 52 and is projected on the rear surface side by penetrating through the operation hole 78 provided above the concave portion 44 of the rear panel 61.

As shown in FIG. 7, the support plate 63 slidably supports the sliding member 62 with the rear panel 61 and prevents the coil spring 64 from dropping off. The support plate 63 is smaller than the rear panel 61 but larger than the sliding member 62, and is fastened and fixed to the external case 21 using fixing screws. With the support plate 63, the rear panel 61 fastened and fixed to the external case 21 using a fastening mechanism such as the fixing screw is assembled with reinforcement. Therefore, a plurality of mounting brackets 79a and fixing portions 79b are provided to the support plate 63.

The battery storing portion 44 having such structure can be assembled in the following manner, for example. First, the elastic holding member 55 is fixed to the top surface on the opposite side to the engagement hole 67 in the concave portion 45 of the rear panel 61, using a fastening mechanism such as adhesive. The elastic holding member 55 may be attached during the following process or may be attached after completing the assembly.

Next, as shown in FIG. 7, the sliding member 62 is brought to face the rear surface of the rear panel 61 and the support plate 63 is disposed on the rear surface thereof such that the sliding member 62 is held in between. Further, the four engagement claws 51, 52 projected on one surface of the sliding portion 62a of the sliding member 62 are penetrated from the rear surface into the four through-holes 66A, 66B provided in the concave portion 45 of the rear panel 61. As a result, as shown in FIG. 10, the top portions of the four engagement claws 51, 52 are respectively projected in the concave portion 45 such that a predetermined space is set between the inner surface of the top end of each of the engagement claws 51, 52 and the bottom surface of the concave portion 45.

Simultaneously, the four guide pins 68 provided in the rear panel 61 are penetrated into the four guide holes 73 provided in the sliding member 62, respectively. Further, the input convex portion 77 provided on the top portion of the operation portion 62b of the sliding member 62 is penetrated into the operation hole 78 provided above the convex portion 45 of the rear panel 61. Accordingly, as shown in FIGS. 8 and 9, the sliding member 62 is held to be relatively movable with respect to the rear panel 61 by the length obtained by subtracting the diameter of the guide pin 68 from the length in the extending direction of the guide hole 73.

Next, the coil spring 64 is interposed between the spring bearing portion 75 of the rear panel 61 and the spring bearing section 74 of the sliding member 62. Subsequently, the support plate 63 is overlapped with the sliding member 62 and the support plate 63 is fastened and fixed to the rear panel 61 using the fixing screws. Accordingly, the sliding member 62 is slidably supported between the support plate 63 and the rear panel 61. Further, the sliding member 62 is always biased by the spring force of the coil spring 64 in the direction away from the engagement hole 67 where the body-side connection terminal 56 is engaged. Thus, the assembly of the battery storing portion 44 is completed, and the battery storing portion 44 can be assembled into the external case 21.

Figures 13A, 13B:
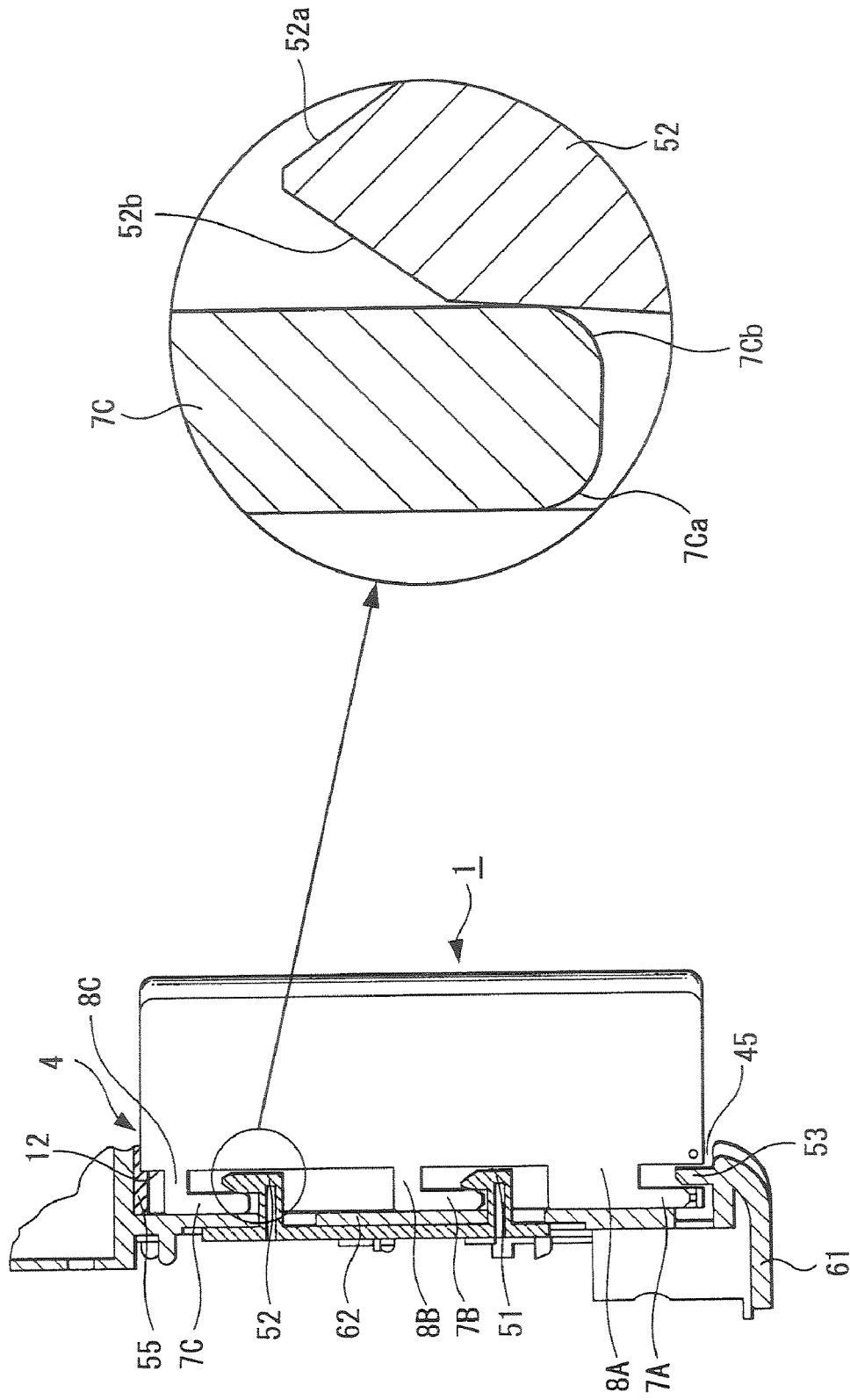

The battery unit 1 can be attached to and detached from the battery storing portion 44 thus assembled, as follows, for example. FIGS. 11A and 11B through FIGS. 14A and 14B are explanatory diagrams showing the battery unit 1 in FIGS. 21 and 22 being attached to and detached from the battery storing portion 44 according to this embodiment. More specifically, FIGS. 11A and 11B are explanatory diagrams showing a state when starting an insertion of the battery unit 1; and FIGS. 12A and 12B are explanatory diagrams showing a state in the middle of inserting the battery unit 1. FIGS. 13A and 13B are explanatory diagrams showing a locked state when completing the insertion of the battery unit 1; and FIGS. 14A, through 14C are explanatory diagrams showing a state when starting a removal of the battery unit 1. It should be noted that regarding the relationship between the two engagement claws 51, 52 and the two convex sections 7B, 7C, operation is the same between the two pairs symmetrically disposed. Therefore, the operation of one pair is explained and the operation of the other pair is not explained in FIGS. 11 through 14.

First, the explanation is made with respect to the case where the battery unit 1 is mounted on the battery storing portion 44. In this case, as shown in FIG. 11A, one side of the battery unit 1 provided with the connection terminal 3 is brought to face the lower side of the concave portion 45 of the battery storing portion 44. Then, end portions of the guides 6, 6 provided on both sides in the width direction of the battery unit 1 are respectively hooked on the convex portions 53, 53 provided at the corner portions on the lower side of the concave portion 45 such that the first convex section 7A is engaged with the convex portion 53. In such engaged state, the battery unit 1 is turned to come close to the battery storing portion 44 with the part contacted with the convex portion 53 as the center of the turning movement. FIG. 11A shows this state.

In this case, as shown in FIGS. 11A and 11B in an enlarged manner, the second convex section 7B of the battery unit 1 comes close to the first engagement claw 51 and the outside inclined surface 7Ba of the second convex section 7B contacts with the outside inclined surface 51a of the first engagement claw 51. From this state, the battery unit 1 is further turned such that the outside inclined surface 7Ba is strongly pressed to the outside inclined surface 51a, and then the first engagement claw 51 is pushed downward against the spring force of the coil spring 64. Accordingly, the whole of the sliding member 62 is pushed downward.

Further, as shown in FIG. 12A, when the top end of the outside inclined surface 7Ba of the second convex section 7B comes close to the top end of the outside inclined surface 51a of the first engagement claw 51, the third convex section 7C of the battery unit 1 comes close to the second engagement claw 52 and the outside circular arc surface 7Ca of the third convex section 7C contacts with the outside inclined surface 52a of the second engagement claw 52 as shown in FIG. 12B in an enlarged manner. At the time of this contact, the contact between the outside inclined surface 7Ba of the second convex section 7B and the outside inclined surface 51a of the first engagement claw 51 is released, and the first engagement claw 51 is shifted in the direction away from the second convex section 7B.

From the state in which the outside circular arc surface 7Ca of the third convex section 7C contacts with the outside inclined surface 52a of the second engagement claw 52, the battery unit 1 is further turned such that the outside inclined surface 52a is strongly pressed by the outside circular arc surface 7Ca, and then the second engagement claw 52 is pushed downward against the spring force of the coil spring 64. Accordingly, the whole of the sliding member 62 is pushed downward, and when the outside circular arc surface 7Ca comes over the top end of the claw portion of the second engagement claw 52, the top end is shifted to the side of the inside circular arc surface 7Cb of the third convex section 7C. Further, when the battery unit 1 is further turned, the sliding member 62 slides in the direction away from the body-side connection terminal 56 by the spring force of the coil spring 64.

As a result, the inside circular arc surface 7Cb of the third convex section 7C and the inside inclined surface 52b of the second engagement claw 52 are shifted in the direction of relatively separating from each other, and the third convex section 7C enters the lower side of the claw portion of the second engagement claw 52. Simultaneously, the second convex section 7B enters the lower side of the claw portion of the first engagement claw 51. FIGS. 13A and 13B in an enlarged manner show this state. Accordingly, the first engagement claw 51 and the second convex section 7B are engaged firmly and simultaneously the second engagement claw 52 and the third convex section 7C are also engaged firmly, and therefore, the battery unit 1 is locked into the battery storing portion 44.

At that time, as shown in FIG. 13A, when the battery unit 1 is completely inserted into the battery storing portion 44, the top end of the battery unit 1 contacts with the elastic holding member 55 and the battery unit 1 enters the battery storing portion 44 with the elastic holding member 55 being elastically deformed. As a result, biasing force generated by the elasticity of the elastic holding member 55 acts on the battery unit 1. Therefore, the battery unit 1 is held further strongly in the battery storing portion 44 by the elastic force of the elastic holding member 55. In this case, if the engaged state between the engagement claws 51, 52 and the convex sections 7B, 7C is released by an erroneous operation, the battery unit 1 is securely held in the battery storing portion 44 by the elastic force of the elastic holding member 55 (a half-released state). Therefore, the battery unit 1 can be prevented from dropping off the battery storing portion 44 by its own weight.

Next, an explanation is made with respect to the case where the battery unit 1 is removed (detached) from the battery storing portion 44. In this case, the input convex portion 77 of the sliding member 62 projected from the operation hole 78 provided above the concave portion 45 of the rear panel 61 is operated toward the release side by user's manual operation. Specifically, the user operates the input convex portion 77 to be pushed downward in this embodiment. Accordingly, the sliding member 62 moves downward against the spring force of the coil spring 64.

In this case, the engaged state of the first engagement claw 51 and second convex section 7B and the engaged state of the second engagement claw 52 and third convex section 7C can be released by operation reverse to the above-described operation at the time of the insertion, where the following effectiveness can be obtained in this embodiment. More specifically, as shown in FIGS. 14A through 14C, the engaged state of the first engagement claw 51 and second convex section 7B is released and next the engaged state of the second engagement claw 52 and third convex section 7C is released. At this time, the engaged state of the second engagement claw 52 and third convex section 7C is still secured (the state shown in FIGS. 14A and 14B) in the state where the engagement of the first engagement claw 51 and second convex section 7B is released (the state shown in FIGS. 14A and 14C). Therefore, there can be eliminated such possibility that the engagement of the two engaged sections are simultaneously released and the battery unit 1 drops off by its own weight as in the related art.

From the state shown in FIGS. 14A through 14C, the sliding member 62 is further pressed downward to release the engaged state of both the engagement claws 51, 52, thereby enabling the operation of detaching the battery unit 1 to be performed. At this time, although the locked state of the battery unit 1 by the engagement claws 51, 52 is released, the battery unit 1 is elastically supported by the elastic holding member 55 and therefore, there can be eliminated such possibility that the battery unit 1 drops off the battery storing portion 44 by an external force to the extent of its own weight. On the other hand, since the power supporting the battery unit 1 with the elastic holding member 55 is small, the user can easily detach the battery unit 1 from the battery storing portion 44 by pulling the battery unit 1.

As described above, the engagement claws on the battery storing portion 44 are slid according to this embodiment. Therefore, the battery unit 1 can be attached to and detached from the battery storing portion 44 easily and securely by the operation of turning the battery unit 1 with one side in the lengthwise direction as the center of turning movement, although the size of the battery storing portion 44 is approximately the same as that of the battery unit 1. Moreover, since the battery unit 1 is elastically held by the elastic holding member 55 after the battery unit 1 is stored in the battery storing portion 44, there can be eliminated the possibility that the battery unit 1 drops off by its own weight or the like, in the case where the lock of the battery unit 1 is released by the erroneous operation or the like.

Figure 15:
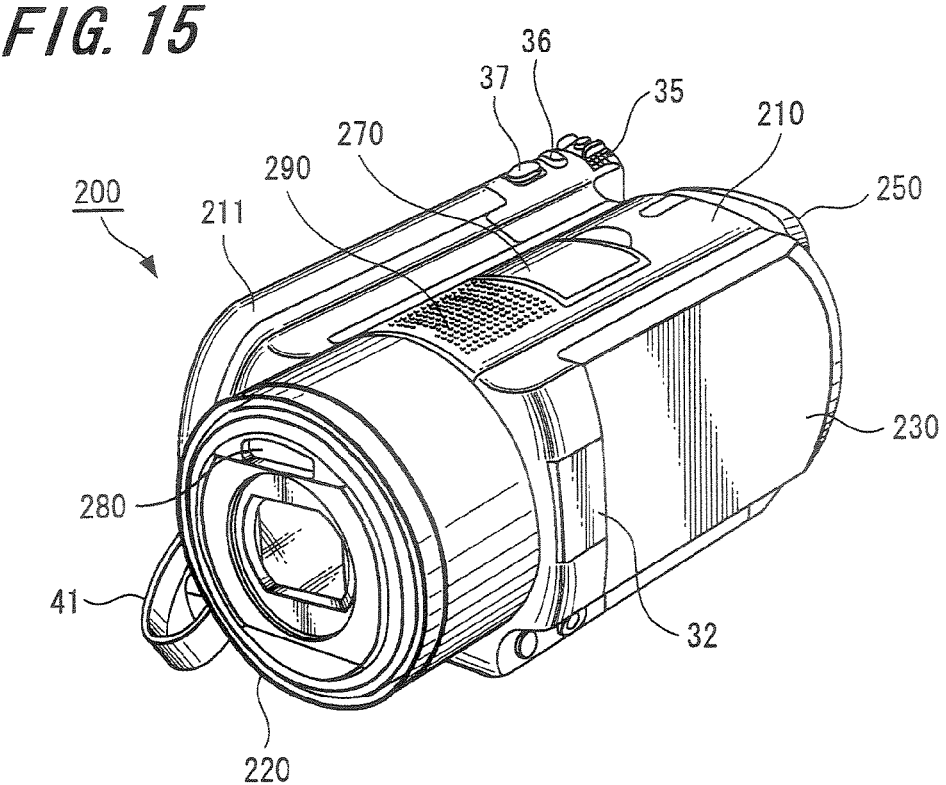
FIG. 15 is a front perspective view of a digital video camera showing a second example of an imaging apparatus representing an electronic apparatus according to another embodiment of the present invention.

FIGS. 15 though 20 are diagrams showing a second example of an electronic apparatus according to another embodiment of the present invention. Similarly to the first example, a digital video camera represents the second example of an electronic apparatus according to another embodiment of the present invention. Difference between a digital video camera 200 according to the second embodiment and the digital video camera 20 according to the first embodiment is that a battery storing portion 440 is set crosswise in the second embodiment. Hence, although external shapes of the digital video camera 200 and digital video camera 20 are different to some extent, in the case of having uniformity in respective apparatuses and mechanisms, such portion is indicated by adding numeral "0" to the reference numeral given to the first embodiment, and further, the same reference numerals are given to the same portion and duplicated explanations thereof are omitted.

As shown in FIGS. 15 through 18, the digital video camera 200 according to this embodiment is configured to have an external case 210, a disk drive unit, a control circuit, a lens unit 220, a display unit 230, and the like. The disk drive unit is stored inside the external case 210, and drives and rotates a hard disk to perform recording (write) and reproduction (read) of an information signal. The control circuit drives and controls the disk drive unit, for example. The lens unit 220 captures an image of an object with light led to a CCD. The display unit 230 is attached to the external case 210 in a freely turnable manner.

The external case 210 is made of an approximately cylindrical hollow case and is used in such a state that an axis direction is set to an anterior-posterior direction. The lens unit 220 having an approximately similar diameter is arranged in the front portion of the external case 210. The lens unit 220 is attached to the external case 210 in a state that an optical axis of the lens system is directed in the horizontal direction. The CCD is attached to the rear part of the lens unit 220 inside the external case 210. Further, a viewfinder unit 250 is disposed behind the lens unit 220.

An opening portion to expose an accessory shoe where an accessory such as a video light and external microphone is detachably mounted is provided in the upper portion of the external case 210. The accessory shoe is disposed right in front of the viewfinder 250 and is normally covered in removable manner with a shoe cap 270 to open and close the opening portion. Furthermore, a built-in stereo microphone 290 is disposed on the upper surface of the external case 210. In addition, a light emitting portion 280 of a flash unit is disposed in the front surface of the lens unit 220.

Figure 16:
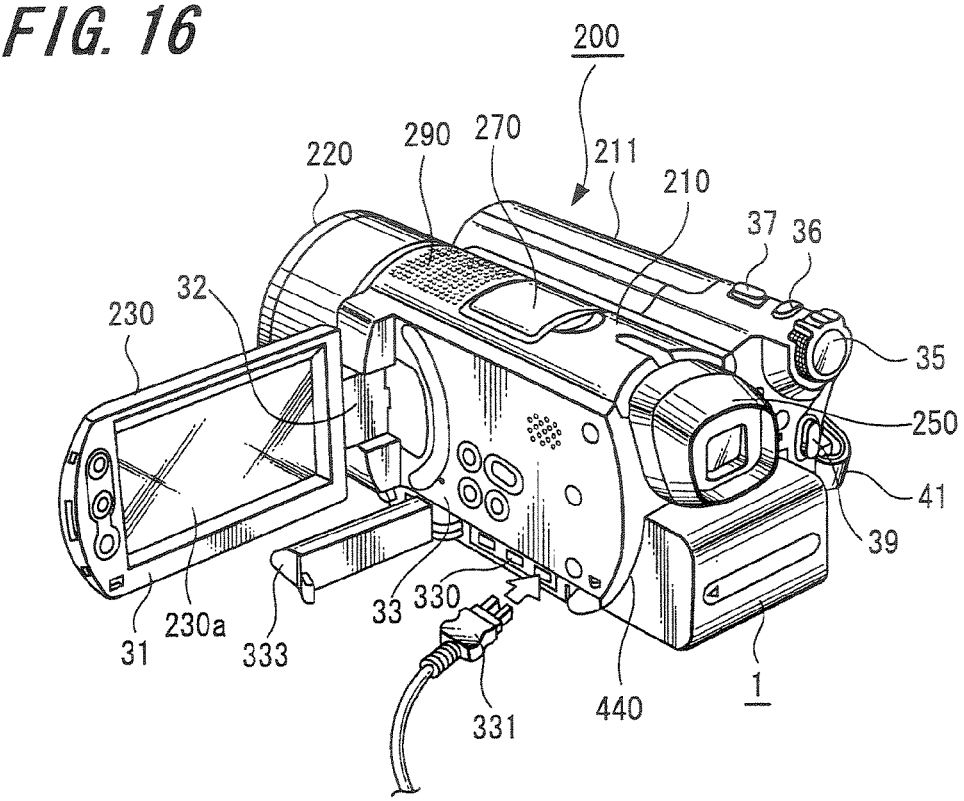
FIG. 16 is a rear perspective view of a digital video camera showing a second example of an imaging apparatus representing an electronic apparatus according to another embodiment of the present invention, in which a display unit and the like of the digital video camera is open.

As shown in FIGS. 15 and 16, the display unit 230 is attached to a lateral surface on one side of the external case 210 in a manner capable of changing a posture. The display unit 230 includes a flat panel 230a made of a flat board-shaped liquid crystal display or the like; a panel case 31 in which the flat panel 230a is stored; and a panel support portion 32 to support the panel case 31 with respect to the external case 210 in a manner capable of changing the posture. The panel support portion 32 has a horizontal turn portion turning the panel case 31 in the horizontal direction by approximately 90° with a vertical axis as the center of turning movement and an anterior-posterior turn portion turning the panel case 31 in an anterior-posterior direction by approximately 180° with a horizontal axis as the center of turning movement.

Accordingly, the display unit 230 can arbitrarily be brought into: a state of being stored on the lateral surface of the external case 210 as shown in FIG. 15, a state of turning the panel case 31 by 90° so that the flat panel 230a faces backward as shown in FIG. 16, a state of turning the panel case 31 by 180' from the state so that the flat panel 230a faces forward, and a state in the middle position thereof. An operation portion 33 including a plurality of operation buttons and a connection terminal portion 330 including a plurality of connection terminals connected to a connector 331 for connecting to external electronic equipment and electronic apparatuses are provided on the lateral surface of the external case 210 that is opened and closed by the display unit 230. The connection terminal portion 330 can be opened and closed with a terminal cover lid 333 being attached to the external case 210 in a freely turnable manner.

Figure 17:
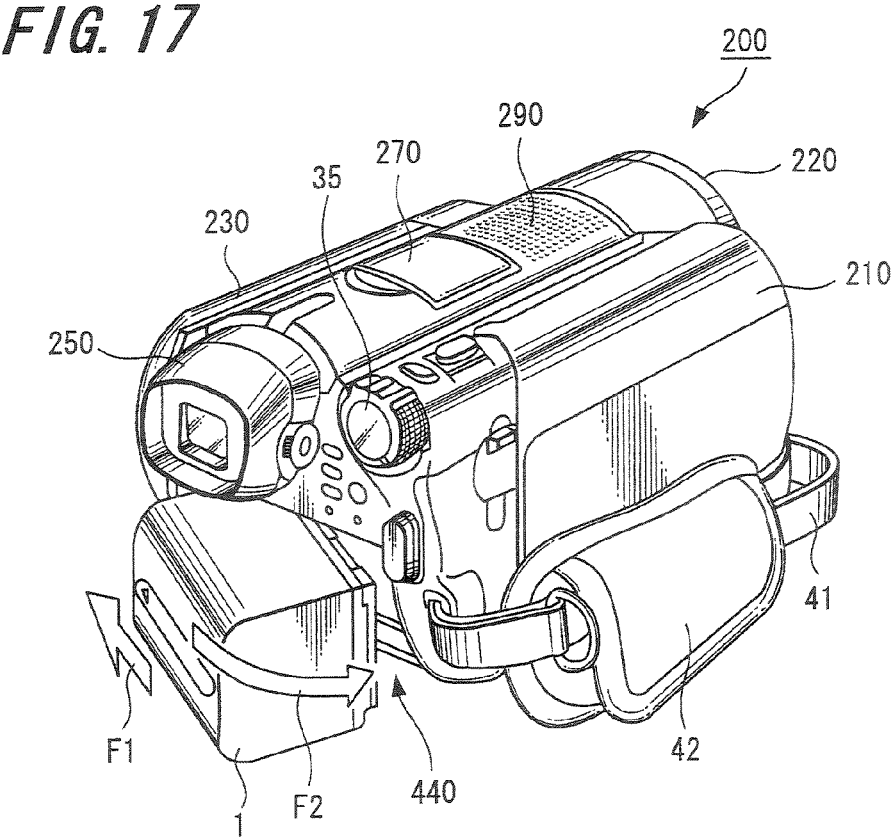
FIG. 17 is a rear perspective view of a digital video camera showing a second example of an imaging apparatus representing an electronic apparatus according to another embodiment of the present invention, in which a mounting and removing operation of a battery unit is explained.

In addition, as shown in figures such as FIG. 17, a grip portion 211 to grip the external case 210 is provided on a lateral surface of the external case 210 on the opposite side to the display unit 230. A power switch 35 also serving as a mode selection switch, a shutter button 36 for capturing a still image, a zoom button 37 for continuously magnifying (telescopic) or reducing (wide) an image within a predetermined range, a record button 39 for capturing a moving image, and the like are provided in the rear part of the grip portion 211. Further, a hand belt 41 is attached to the external case 210 and a hand pad 42 is attached to the hand belt 41.

Figure 18:
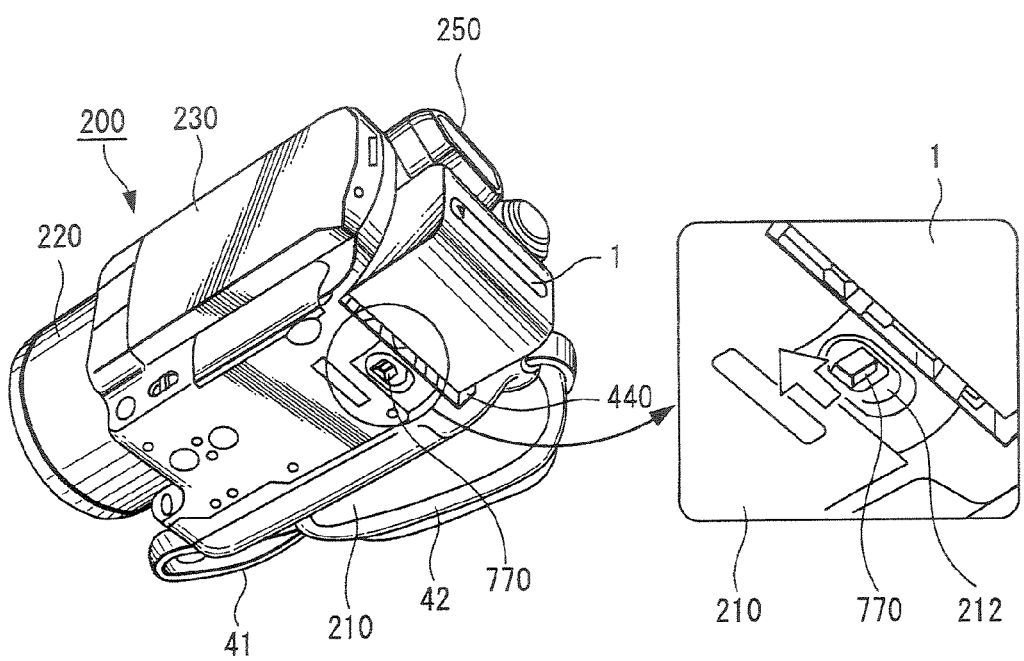
FIG. 18 is a rear upward perspective view of a digital video camera showing a second example of an imaging apparatus representing an electronic apparatus according to another embodiment of the present invention, in which the mounting and removing operation of the battery unit is explained.

As shown in FIGS. 16 through 18, on the rear surface of the external case 210 is provided a battery storing portion 440 where the battery unit 1 of a portable power source is detachably mounted. The battery storing portion 440 is configured to have a rear panel 610, a sliding member 620, a support plate 630, a coil spring 640, and the like. The rear panel 610 constitutes a part of the external case 210. The sliding member 620 is slidably attached to the inner surface of the rear panel 610 in the upper-lower direction. The support plate 630 slidably supports the sliding member 620 on the rear panel 610. The coil spring 640 shows a specific example of a biasing member to bias the sliding member 620 in a direction away from the body-side connection terminal 560.

Similarly to the battery storing portion 44 in the above-described first embodiment, the battery storing portion 440 includes a rectangular concave portion 450 having a size approximately the same as the battery unit 1, and the concave portion 450 is provided such that the lengthwise direction thereof is directed in the left-right direction. In the concave portion 450 of the battery storing portion 440 are provided two pairs, that is, total four pieces of engagement claws 510, 520 formed of a combination of the first engagement claws 510 and second engagement claws 520 movable in the left-right direction, a guide portion 530 for mounting the battery, a body-side connection terminal 560 on the electronic apparatus side capable of being electrically connected to the connection terminal 3 of the battery unit 1 connected thereto, and the like.

AS shown in FIGS. 19 and 20, the two pairs, that is, total four pieces of engagement claws 510, 520 are provided on the sliding member 620 and are disposed in the concave portion 450 at positions along longer sides on both sides in the widthwise direction and in the middle in the lengthwise direction at predetermined intervals. More specifically, the two pairs of engagement claws 510, 520 are disposed opposing to each other in the upper-lower direction and are slidably inserted into two pairs, that is, total four pieces of through-holes 660A, 660B provided on the rear surface 450*a* of the concave portion 450 constituting the bottom surface of the battery storing portion 440. It should be noted that the four engagement claws 510, 520 have structures similar to the engagement claws 51, 52 in the above-described embodiment.

Further, the guide portion 530 is provided at an end in the left-right direction that is the lengthwise direction of the rear surface 450*a* of the concave portion 450, and the body-side connection terminal 560 is provided at the other end in the left-right direction that is the opposite side thereto. Both the guide portion 530 and the body-side connection terminal 560 are disposed approximately at the center in the upper-lower direction that is the widthwise direction, and an inclined surface 530*a* inclining downward toward the body-side connection terminal 560 is provided in the guide portion 530. It should be noted that a sliding projection section 450*b* to support the battery unit 1 by line contact is provided on the rear surface 450*a* of the concave portion 450. The battery unit 1 is supported on the sliding projection section 450*b* by the line contact, thereby reducing a frictional resistance when sliding.

As shown in FIG. 20, a sliding portion 620*a* of the sliding member 620 is provided along the rear surface of the rear panel 610. The four engagement claws 510, 520 are provided on one surface of the sliding portion 620*a*, and a spring bearing section 620*a* is provided on the other surface thereof. The support plate 630 screwed to the rear panel 610 is disposed on the rear surface of the sliding member 620, thereby the sliding member 620 being prevented from dropping off. Further, the spring bearing section 630*a* to support one end of the coil spring 640 is provided on the support plate 630. The coil spring 640 is interposed in a compressed state between the spring bearing section 630*a* and the spring bearing section 620*a* of the rear panel 620. The sliding member 620 is always biased in the direction away from the body-side connection terminal 560 by the spring force of the coil spring 640.

As shown in FIGS. 18 and 19, an operation portion of the sliding member 620 is extended to the bottom surface, and an input convex portion 770 provided at the top end thereof is exposed on the bottom surface of the external case 210. The input convex portion 770 is stored in a cone-shaped concave portion 212 provided on the bottom surface of the external case 210. Accordingly, the top end surface of the input convex portion 770 may not protrude further downward from the bottom surface of the external case 210. The four engagement claws 510, 520 with the sliding member 620 can be moved integrally in the direction toward the body-side connection terminal 560 by sliding the input convex portion 770 against the spring force of the coil spring 640. Subsequently, the input convex portion 770 is released, and so the sliding member 620 moves in the direction away from the body-side connection terminal 560 by the spring force of the coil spring 640.

Similarly to the case of the digital video camera 20 explained in the above-described embodiment, similar effectiveness can be obtained through a similar action also in the digital video camera 200 with such configuration showing the second specific example of the electronic apparatus according to the second embodiment of the present invention. Next, attaching and detaching operation on the battery unit 1 according to this embodiment is briefly explained using FIGS. 17 and 18.

In the case of mounting the battery unit 1 on the battery storing portion 440, the battery unit 1 is turned sideways to face the concave portion 450 of the battery storing portion 440 such that the connection terminal 3 thereof is brought to face the body-side connection terminal 560. Then, as shown in FIG. 17, the side of connection terminal 3 of the battery unit 1 is inserted into the battery storing portion 440 (see arrow F1). Subsequently, the other side of the battery unit 1 opposite to the side of connection terminal 3 is pushed into the battery storing portion 440 (see arrow F2). Accordingly, the battery unit 1 can be mounted on the battery storing portion 440 as shown in FIG. 16.

In this case, upon pressing the other side of the battery unit 1 opposite to the side of connection terminal 3 to a certain degree, the corner portion of the base portion 5 positioned on the other side of the battery unit 1 opposite to the side of connection terminal 3 contacts with the inclined surface portion 530*a* of the guide portion 530 provided in the concave portion 45. With this contact, pressing force for causing the battery unit 1 to move toward the body-side connection terminal 560 is generated to the battery unit 1 from the inclined surface 530*a* of the guide portion 530 as reaction force to the force pressing the battery unit 1. Then, the battery unit 1 is pressed with more pressing force, thereby the corner portion of the base portion 5 slidably moving by the guide along the inclined surface 530*a*. Consequently, the battery unit 1 is completely inserted into the battery storing portion 440 as shown in FIG. 20.

At that time, such operation as described in the first embodiment is performed between the four convex sections 7B, 7C of the battery unit 1 and the four engagement claws 510, 520 of the sliding member 620 to be mutually engaged. Simultaneously, the connection terminal 3 of the battery unit 1 and the body-side connection terminal 560 are engaged with each other. Hence, the battery unit 1 and the digital video camera 200 are electrically connected. As a result, power is supplied to the digital video camera 200 from the battery unit 1, and so such operation as capturing a moving image, still image and the like can be performed.

On the other hand, in the case of detaching the battery unit 1 from the battery storing portion 440, the input convex portion 770 on the sliding member 620 representing an eject button disposed on the bottom surface of the external case 210 is slid toward the body-side connection terminal 560 against the spring force of the coil spring 640 as shown in FIG. 18. Accordingly, the locked state of the four convex sections 7B, 7C by the four engagement claws 510, 520 is released through the sliding operation of the sliding member 620, and the battery unit 1 can be brought into a state of being detached.

Then, the battery unit 1 is pulled out from the inside of the convex portion 450 by holding a part of the battery unit 1 on the opposite side to the connection terminal 3. Accordingly, the battery unit 1 can be detached easily and quickly from the battery storing portion 440. According to such second embodiment of the present invention, since the battery unit 1 is turned sideways to be stored, the height of the digital video camera 200 can be lowered and a flexibility can be improved in design during a process of designing the video camera. In addition, since the lock of the battery unit 1 can be released only by the sliding operation of the input convex portion 770 of the sliding member 620 that is the release button, the mounting and removing operation of the battery unit 1 can be simplified and an usability can be improved.

Further, the insertion operation and removing operation of the battery unit 1 can be performed smoothly since the guide portion 530 is provided in the battery storing portion 440. Moreover, the battery unit 1 can be stored securely in the predetermined position at the time of the insertion, and so the connection terminal 3 and the body-side connection terminal 560 can be prevented from being connected in an incomplete state.

As explained above, electronic apparatuses according to embodiments of the present invention include movable engagement claws on the electronic apparatus side, and the battery unit can be mounted and removed without sliding. Accordingly, the whole electronic apparatus can be small-sized, since the size such as the height or width of the electronic apparatus can be reduced to the extent of the battery unit not sliding. Furthermore, only a part of the engagement claws is released and the engaged state of the other engagement claws is maintained in the state of the input convex portion of the sliding member representing the release button being operated within the predetermined range. Hence, such possibility of the battery unit detaching from the battery storing portion and falling off by mistake can be prevented.

An embodiment of the present invention is not limited to the embodiments described above and shown in the drawings, but various alterations and modifications are possible without departing from the scope and spirit of the present invention. In the above-described embodiments, the examples of application to the digital video camera are explained as specific examples of the imaging apparatus, for example, but it is obvious that an embodiment of the present invention can be applied to an analogue video camera and further to an electronic still camera, a personal computer, an electronic dictionary, a DVD player, a car navigation system, and other various kinds of electronic apparatuses. Further, the explanation has been made with respect to the embodiments in which four engagement claws and convex sections are provided as the engagement claw and the concave section engaged therewith in the embodiments described above. However, at least one engagement claw and one convex section may be needed, and it is desirable to provide the engagement claws and convex sections of even numbers capable of being disposed symmetrically in view of the balance when storing a battery unit It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus comprising:
a case body having a battery storing portion formed of a concave portion whose shape is approximately corresponding to an external shape of a battery unit; and
a sliding member slidably supported on a surface of said case body on the opposite side to said battery storing portion, wherein
said battery storing portion has a width corresponding to a width of said battery unit, a length corresponding to a length of said battery unit inserted by turning with one side in the length direction as the center, and a body-side connection terminal connected to a connection terminal of the battery unit turned and inserted into the battery storing portion; and
said sliding member includes one or more engagement claws penetrating through said case body, projecting to the inside of said battery storing portion and capable of being engaged with engagement convex portions provided in said battery unit, and a biasing member causing said one or more engagement claws to be biased away from said body-side connection terminal and engaged with said engagement convex portions.

2. An electronic apparatus according to claim 1, wherein said battery storing portion includes a holding mechanism to hold said battery unit after the engagement between said engagement claws and said engagement convex portions is released by biasing said inserted battery unit.

3. An electronic apparatus according to claim 2, wherein said holding mechanism is an elastic holding member such as rubber, synthetic resin, plate spring, and coil spring elastically contacting with a surface of said mounted battery unit on the opposite side to a surface where said connection terminal is provided.

4. An electronic apparatus according to claim 1, wherein a guide portion to guide said battery unit toward the body-side connection terminal based on pressing force applied to the battery unit when mounting said battery unit is provided on the opposite side to said body-side connection terminal in said battery storing portion.

5. An electronic apparatus according to claim 1, wherein said one or more engagement claws include a first engagement claw and a second engagement claw provided in the length direction of said battery unit with a predetermined space in between and respectively engaged with two engagement convex portions provided in said battery unit, and
said first engagement claw and said second engagement claw are provided such that said first engagement claw disposed close to said body-side connection terminal contacts with said engagement convex portion of said battery unit before said second engagement claw disposed away from said body-side connection terminal contacts therewith, when turning said battery unit to be stored in said battery storing portion.

6. An electronic apparatus according to claim 5, wherein said one or more engagement claws include two pairs of first engagement claws and second engagement claws disposed symmetrically, provided in the length direction of said battery unit with the predetermined space in between, and respectively engaged with four engagement convex portions provided in said battery unit.

* * * * *